United States Patent
Goodnough et al.

(10) Patent No.: US 9,664,562 B1
(45) Date of Patent: May 30, 2017

(54) METHOD AND SYSTEM FOR SCANNING STARING FOCAL PLANE ARRAY IMAGING

(71) Applicant: LOCKHEED MARTIN CORPORATION, Bethesda, MD (US)

(72) Inventors: Mark A. Goodnough, Santa Ynez, CA (US); Jeffrey W. Scott, Santa Barbara, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 131 days.

(21) Appl. No.: 14/178,718

(22) Filed: Feb. 12, 2014

Related U.S. Application Data

(60) Provisional application No. 61/763,864, filed on Feb. 12, 2013.

(51) Int. Cl.
  *G01J 3/02* (2006.01)
  *H04N 5/225* (2006.01)
  (Continued)

(52) U.S. Cl.
  CPC .......... *G01J 3/0286* (2013.01); *G01J 3/0289* (2013.01); *G02B 23/00* (2013.01); *H04N 5/2251* (2013.01);
  (Continued)

(58) Field of Classification Search
  CPC ........................................... G06T 2207/10048
  (Continued)

(56) References Cited

U.S. PATENT DOCUMENTS

| 5,129,595 A * | 7/1992 | Thiede | F41G 7/2213 244/3.16 |
| 5,654,549 A * | 8/1997 | Landecker | G02B 27/644 250/332 |

(Continued)

FOREIGN PATENT DOCUMENTS

| EP | 2458396 | 5/2012 |
| ES | 2344391 | 8/2010 |

(Continued)

OTHER PUBLICATIONS

Volakis et al., Small Wideband and Conformal Metamaterial Antennas and Arrays, Dec. 8, 2010, pp. 1-48.
(Continued)

*Primary Examiner* — Twyler Haskins
*Assistant Examiner* — Akshay Trehan
(74) *Attorney, Agent, or Firm* — Terry M. Sanks, Esq.; Beusse Wolter Sanks & Maire, PLLC

(57) ABSTRACT

A system includes a focal plane array (FPA), support structure, optical assembly, flexing structure, and drive actuator. The FPA includes multiple pixels. The FPA captures an image as image data during an integration time interval. The optical assembly is fixed to the support structure and forms an image of a scene at the FPA. The flexing structure is mechanically coupled to both the support structure and the FPA, and allows the FPA to move relative to the support structure. The actuator is mechanically coupled to the FPA, and drives the FPA to move relative to the support structure. Some FPA have all readout elements arranged in a first regular grid with constant spacing, while some detector elements are on that grid and other detector elements are on a different grid offset by less than the constant spacing to provide sub-pixel resolution.

29 Claims, 25 Drawing Sheets

(51) Int. Cl.
*H04N 5/232* (2006.01)
*G02B 23/00* (2006.01)

(52) U.S. Cl.
CPC ....... *H04N 5/2259* (2013.01); *H04N 5/23287* (2013.01)

(58) Field of Classification Search
USPC .................. 348/162–168; 250/338.1–353
See application file for complete search history.

(56) References Cited

U.S. PATENT DOCUMENTS

| | | | |
|---|---|---|---|
| 5,663,825 A * | 9/1997 | Amon | G01S 3/789 250/230 |
| 5,826,178 A | 10/1998 | Owen | |
| 6,326,783 B1 | 12/2001 | Tanaka | |
| 6,795,037 B2 | 9/2004 | Greim | |
| 6,806,710 B1 | 10/2004 | Renz et al. | |
| 6,927,528 B2 | 8/2005 | Barillot et al. | |
| 6,943,551 B2 | 9/2005 | Eberler et al. | |
| 6,985,118 B2 | 1/2006 | Zarro et al. | |
| 7,242,364 B2 | 7/2007 | Ranta | |
| 7,345,475 B2 | 3/2008 | Takeuchi et al. | |
| 7,365,701 B2 | 4/2008 | Werner et al. | |
| 7,501,823 B2 | 3/2009 | Nistler et al. | |
| 7,532,008 B2 | 5/2009 | Pendry et al. | |
| 7,623,745 B2 | 11/2009 | Podolskiy et al. | |
| 7,626,392 B2 | 12/2009 | Nistler et al. | |
| 7,688,070 B2 | 3/2010 | Weyers et al. | |
| 7,710,336 B2 | 5/2010 | Schweizer et al. | |
| 7,760,965 B2 | 7/2010 | Tener et al. | |
| 7,808,722 B2 | 10/2010 | Tonucci | |
| 7,864,394 B1 | 1/2011 | Rule et al. | |
| 8,014,062 B2 | 9/2011 | Scott et al. | |
| 8,212,880 B2 * | 7/2012 | Anderson | H04N 5/2252 348/208.7 |
| 8,428,385 B2 * | 4/2013 | Whiteside | G06T 5/002 382/260 |
| 8,823,848 B2 * | 9/2014 | Chipman | G01J 4/04 348/208.2 |
| 9,194,750 B2 * | 11/2015 | Oster | G01J 5/06 |
| 9,235,876 B2 * | 1/2016 | Hogasten | G06T 5/50 |
| 2004/0244625 A1 | 12/2004 | Tiernan et al. | |
| 2005/0033154 A1 | 2/2005 | deCharms | |
| 2006/0255275 A1 * | 11/2006 | Garman | G01J 5/06 250/338.1 |
| 2007/0200566 A1 | 8/2007 | Clark et al. | |
| 2008/0165079 A1 | 7/2008 | Smith et al. | |
| 2009/0040131 A1 | 2/2009 | Mosallaei | |
| 2009/0096545 A1 | 4/2009 | O'Hara et al. | |
| 2009/0099623 A1 | 4/2009 | Bentwich | |
| 2009/0140946 A1 | 6/2009 | Ziolkowski et al. | |
| 2009/0156976 A1 | 6/2009 | Korbling et al. | |
| 2009/0201221 A1 | 8/2009 | Werner et al. | |
| 2009/0224962 A1 | 9/2009 | Pao et al. | |
| 2009/0284644 A1 * | 11/2009 | McKaughan | G01C 3/08 348/348 |
| 2010/0003197 A1 | 1/2010 | Bikram | |
| 2010/0046853 A1 | 2/2010 | Goodnough et al. | |
| 2010/0097048 A1 | 4/2010 | Werner et al. | |
| 2010/0133488 A1 | 6/2010 | Giakos | |
| 2010/0239504 A1 | 9/2010 | Liu et al. | |
| 2010/0259345 A1 | 10/2010 | Kim et al. | |
| 2011/0074425 A1 | 3/2011 | Chu et al. | |
| 2011/0077506 A1 | 3/2011 | Driehuys et al. | |
| 2011/0204891 A1 | 8/2011 | Drake et al. | |
| 2011/0209110 A1 | 8/2011 | Grbic et al. | |
| 2011/0267244 A1 | 11/2011 | Rajgopal et al. | |
| 2011/0279681 A1 * | 11/2011 | Cabib | G01J 5/06 348/164 |
| 2011/0287218 A1 | 11/2011 | Narimanov | |
| 2012/0081511 A1 * | 4/2012 | Kasunic | H04N 5/23238 348/36 |
| 2012/0082441 A1 * | 4/2012 | Krueger | G01C 11/02 396/7 |
| 2012/0105061 A1 | 5/2012 | Drake et al. | |
| 2012/0105267 A1 | 5/2012 | DeLia et al. | |
| 2012/0211665 A1 * | 8/2012 | Cloud | G01S 7/4804 250/394 |
| 2012/0228563 A1 | 9/2012 | Fuller et al. | |
| 2013/0002253 A1 | 1/2013 | Werner et al. | |
| 2013/0127463 A1 | 5/2013 | Matschl et al. | |
| 2013/0187647 A1 | 7/2013 | Walsh et al. | |
| 2013/0314567 A1 * | 11/2013 | McComas | H04N 5/2258 348/239 |
| 2014/0152486 A1 | 6/2014 | Apostolos et al. | |

FOREIGN PATENT DOCUMENTS

| | | |
|---|---|---|
| GB | 2363845 | 1/2002 |
| KR | 10-2008-0004706 | 1/2008 |

OTHER PUBLICATIONS

Erentok et al., Lumped Element Capacitor Based Two-Dimensional Efficient Metamaterial-inspired Electrically-Small Antenna, 2007, pp. 19-22.

Freire et al., "Experimental Demonstration of a μ=-1 Metamaterial Lens for Magnetic Resonance Imaging," Appl. Phy. Lett., 93, 231108 (2008).

Wiltshire et al., "Microstructured Magnetic Materials for RF Flux Guides in Magnetic Resonance Imaging," Science, 291, 849 (2001).

Freire et al., "Planar Magnetoinductive Lens for Three-Dimensional Subwavelength Imaging," Appl. Phys. Lett., 86, 182505 (2005).

Lapine et al., "Realistic Metamaterial Lenses: Limitations Imposed by Discrete Structure," Physical Review B, 82, 165124 (2010).

C.P. Scarborough, "Experimental Demonstration of an Isotropic Metamaterial Super Lens with Negative Unity Permeability at 8.5 MHz," Applied Physics Letters, 101(1), 2, (2012).

Goussetis et al., "Periodically Loaded Dipole Array Supporting Left-Handed Propagation," IEE Proc.-Microw. Antennas Propag., vol. 152, No. 4, Aug. 2005.

Freire et al., "On the Applications of μr=-1 Metamaterial Lenses for Magnetic Resonance Imaging," Journal of Magnetic Resonance, vol. 203, 2010, pp 81-90 (Available online:Dec. 29, 2009).

Iyer et al., "A Three-Dimensional Isotropic Transmission-line Metamaterial Topology for Free-space Excitation," Applied Physics Letters, vol. 92, 2008, pp. 261106-1-261106-3 (Published Online: Jul. 1, 2008).

Jiang et al., "An Isotropic 8.8 MHz Magnetic Meta-Lens," 2011 IEEE International Symposium on Antennas and Propagation (APSURSI), IEEE, Jul. 3, 2011 pp. 1151-1154.

Pendry et al., "Magnetism from Conductors and Enhanced Nonlinera Phenomena, "IEEE Transactions on Microwave Theory and Techniques, vol. 47, No. 11, Nov. 1999, pp. 2075-2084.

Penny et al., "Computation of Fields and SAR for MRI With Finite-Difference, Time-Domain Software," Microwave Journal, Dec. 2007 Issue.

Syms et al., "Flexible Magneto-Inductive Resonators and Waveguides," EEE Dept., Imperial College London, 2008.

Solymar et al. "Rotational Resonance of Magnetoinductive Waves: Basic Concept and Application to Nuclear Magnetic Resonance," Journal of Applied Physics, vol. 99, 2006, pp. 12908-1-23908-8.

Babu et al., "Electron Paramagnetic Study on Radical Scavenging Properties of Ceria Nanoparticles", Chemical Physics Letters, 442, 2007, pp. 405-408.

Patil et al., "Protein Adsorption and Cellular Uptake of Cerium Oxide Nanoparticles as a Function of Zeta Potential", Biomaterials 28, 2007, pp. 4600-4607.

Pendry, "Negative Refraction Makes a Perfect Lens", Physical Review Letters, vol. 85, No. 18, Oct. 30, 2000, pp. 3966-3969.

Tarnuzzer et al., "Vacancy Engineered Ceria Nanostructures for Protection from Radiation-Induced Cellular Damage", Nano Letters, vol. 5, No. 12, 2005, pp. 2573-2577.

(56) References Cited

OTHER PUBLICATIONS

Zotev et al., "Microtesia MRI of the Human Brain Combined with MEG", Los Alamos National Laboratory, Applied Modern Physics Group, MS D454, pp. 1-8.
McDermott et al., "Microtesla MRI with a Superconducting Quantum Interference Device" PNAS May 25, 2004, vol. 101 No. 21 7857-7861.
Penciu et al., "Multi-Gap Individual and Coupled Split-Ring Resonator Structures" Optics Express, vol. 16, No. 22, Oct. 27, 2008, pp. 18131-18144.
Jelinek et al., "A Magnetic Metamaterial Composed of Randomly Oriented SRRs" Piers Online, vol. 2, No. 6, 2006, pp. 624-627.
Guven et al., Near Field Imaging in Microwave Regime Using Double Layer Split-Ring Resonator Based metamaterials, Optoelectronics Review 14:3, pp. 213-216.
Welker et al., "Radio-Frequency Coil Selection for MR Imaging of the Brain and Skull Base," Radiology, 2001.

\* cited by examiner

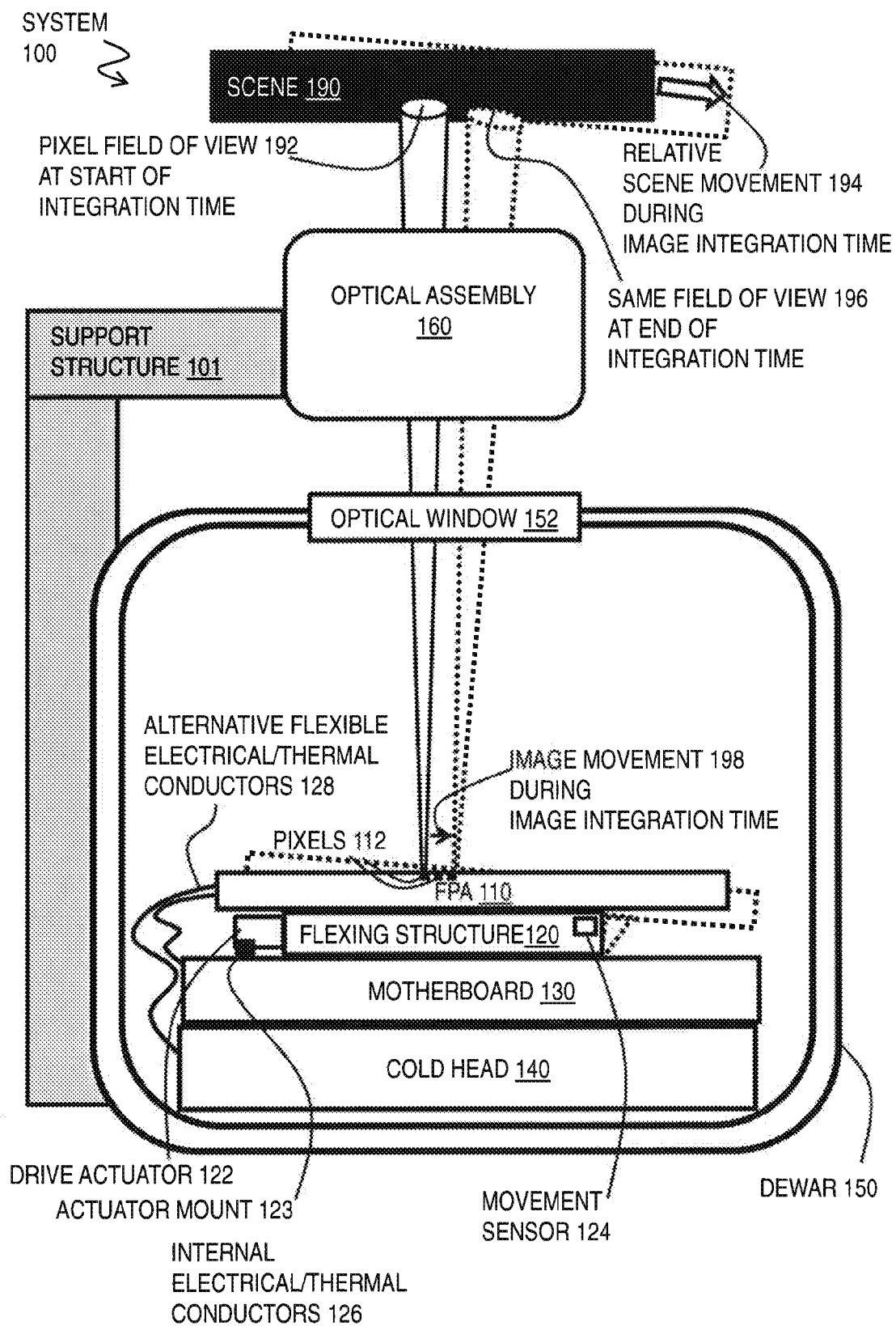

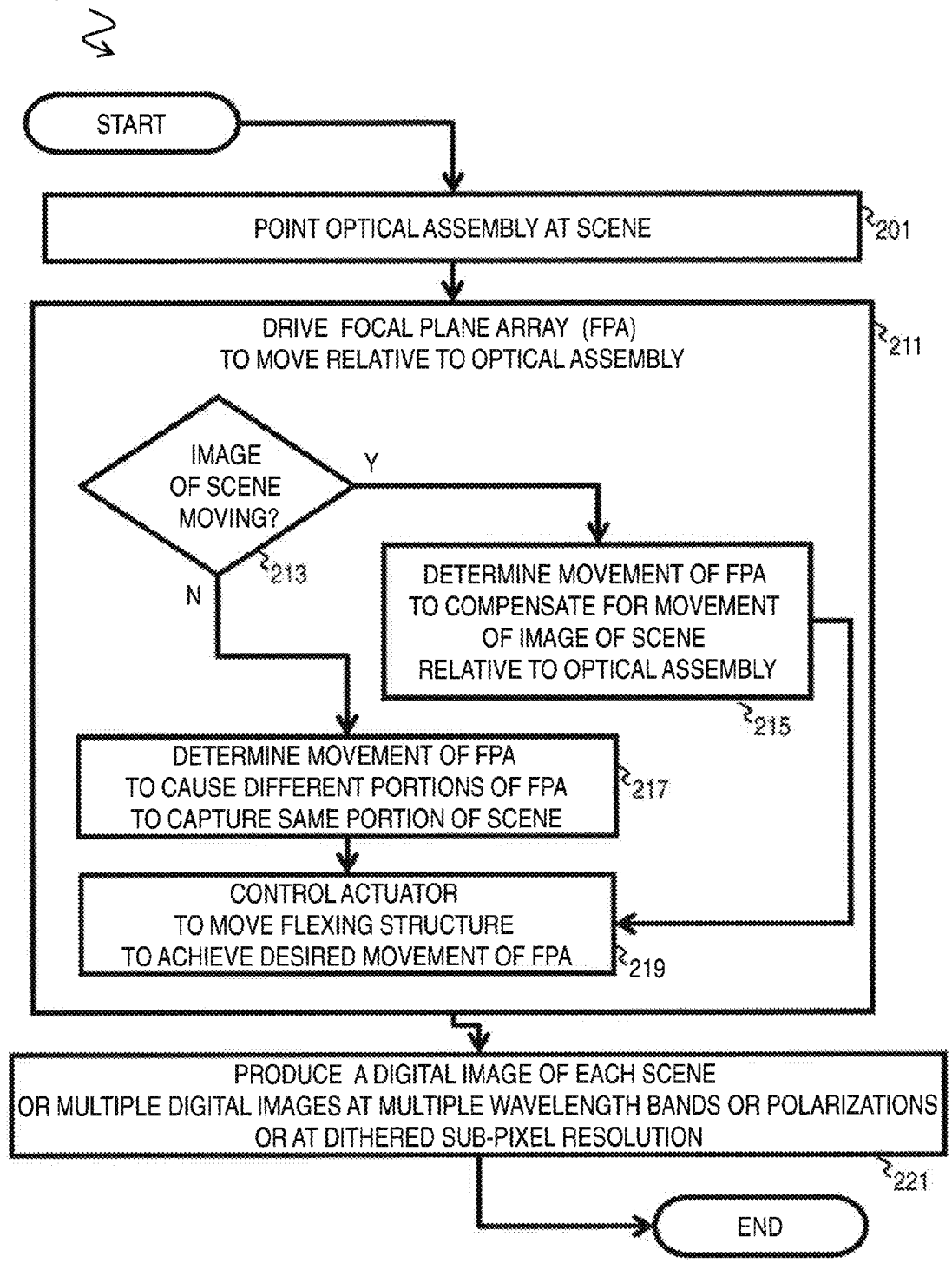

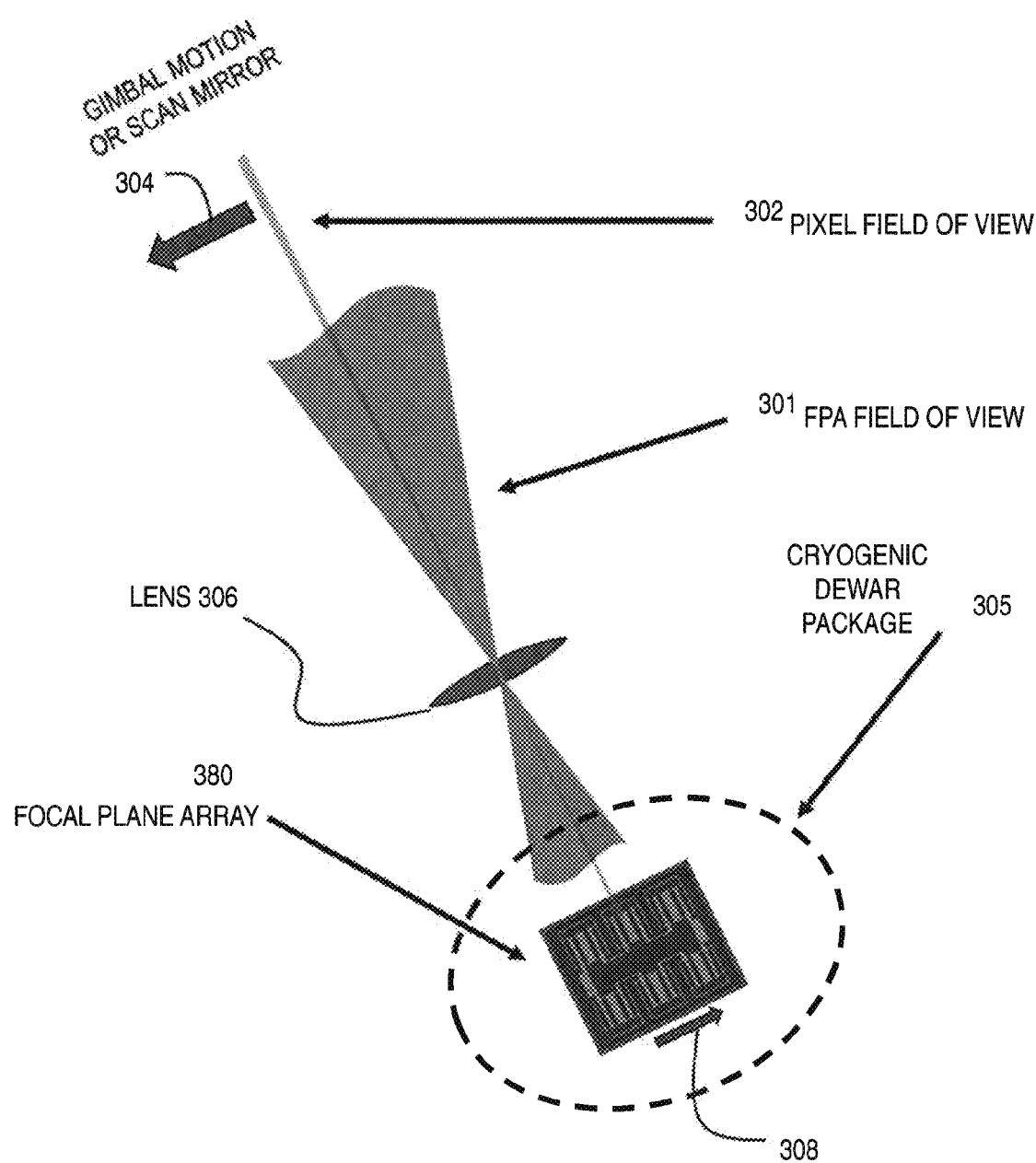

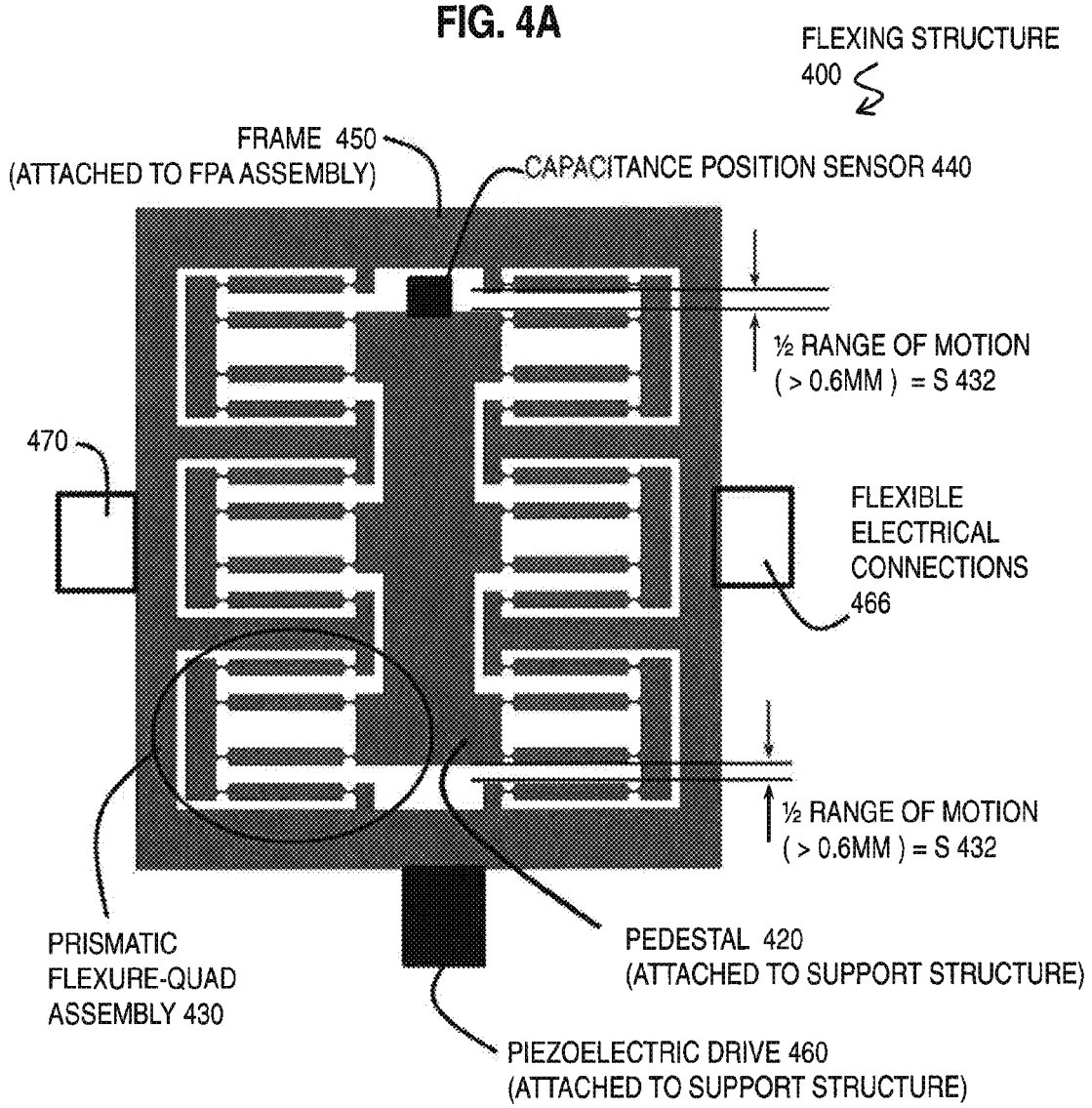

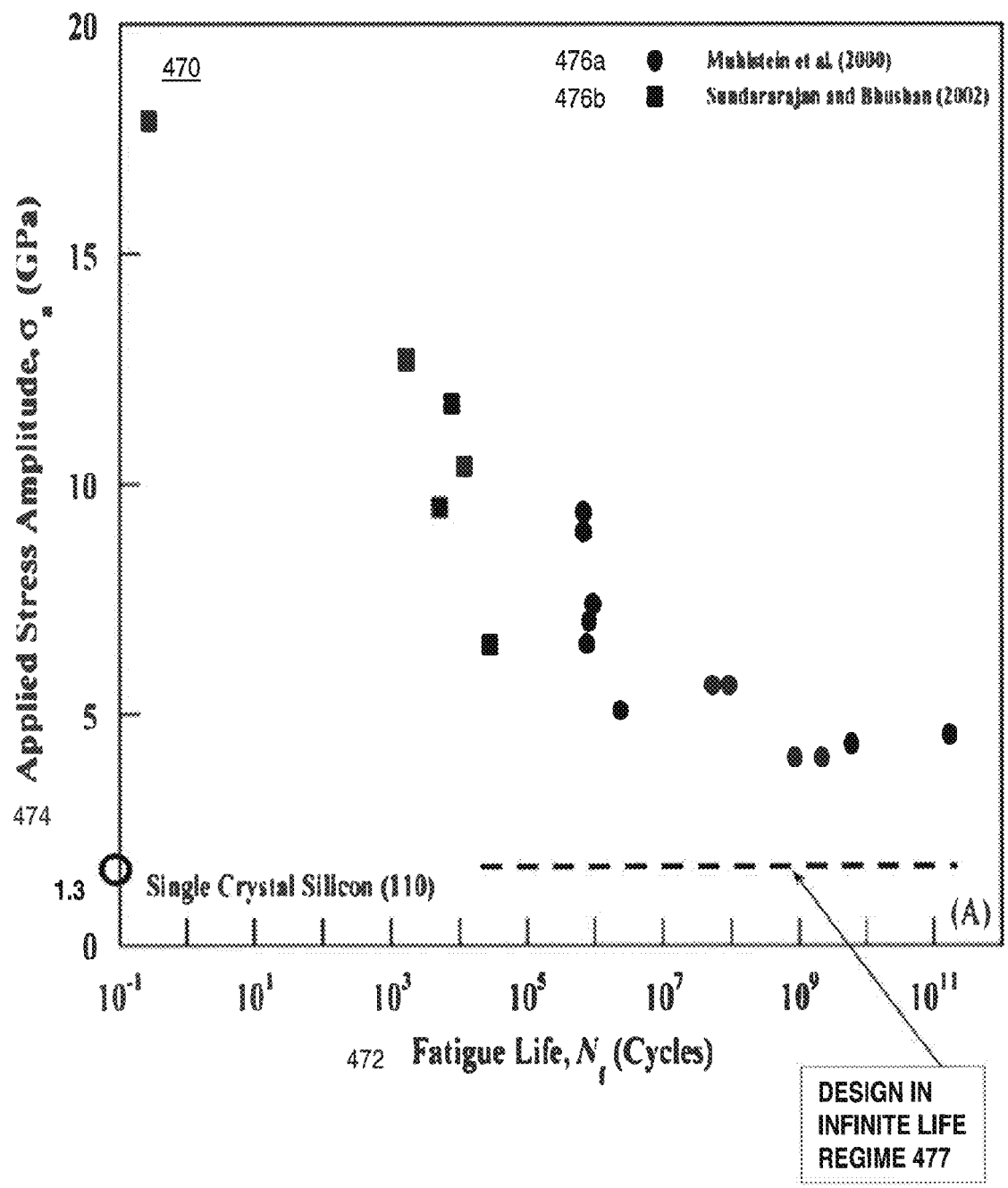

884

FOCAL PLANE
ARRAY
WITH 4
DITHERED 884
DETECTOR
REGIONS $T_{INT}$ = 4MS
160 ROWS
0.96MM

320 PIXEL
STEP SIZE

RELATIVE
MOVEMENT 501
OF FPA FIELD OF VIEW
ACROSS SCENE

Two 3" Dewars, Six 3Mpix FPAs

FPA WITH FOUR SPECTRAL FILTERS 987

RELATIVE MOVEMENT 501 OF FPA FIELD OF VIEW ACROSS SCENE

FPA WITH FOUR SPECTRAL FILTERS 987

RELATIVE MOVEMENT 501 OF FPA FIELD OF VIEW ACROSS SCENE

FPA 780a

Where: Specification
N / M  Axial ratio of the minor / major axis
+ N / M  Right hand rotation (counter clockwise)
− N / M  Left hand rotation (clockwise)
φ  Ellipse tilt rotation from the X Axis When N / M = 1
Signifies Circular Polarization When N = 0
Signifies Linear Polarization

FIG. 10C
FPA WITH FOUR
POLARIZATION FILTERS
1086
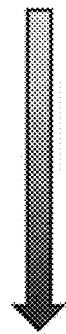
| Polarization 1 : (0°) | 1051 |
| Polarization 2 : (45°) | 1052 |
| Polarization 3 : (90°) | 1053 |
| Polarization 4 : (135°) | 1054 |

METHOD AND SYSTEM FOR SCANNING STARING FOCAL PLANE ARRAY IMAGING

CROSS-REFERENCE TO RELATED APPLICATIONS

This application claims the benefit of U.S. Provisional Application No. 61/763,864 filed Feb. 12, 2013, and incorporated herein by reference in its entirety, under 35 U.S.C. §119(e).

BACKGROUND

As is well known, a pixel refers to a picture element in digital image data. The pixel includes data that indicates the color or intensity of light, or some combination, at an undivided spot in the image. As used herein, the term pixel also refers to the smallest photosensor component that determines the color or intensity or both of light (photons) striking the sensor.

Very wide area applications such as persistent surveillance need very large images (100's to 1000's of Megapixels, Mpixels, 1 Mpixel=$10^6$ pixels) at high revisit rates (1 to 30 Hz). A frame rate indicates how quickly a new image of the same size as a focal plane array can be collected. A revisit rate indicates how quickly a new or composite image of the total scene under surveillance is collected. Historically, linear arrays using relatively small number of pixels have been scanned across a scene to reproduce the image. More recently two-dimensional arrays of pixels, known as staring arrays, have been used in a step stare mode where the image is produced by stitching together smaller images from a patchwork of snapshots as a quilt is stitched together from cloth patches.

A useful metric for the quality of imaging at long distances is the sensitivity, which is typically measured as the noise-equivalent-delta-temperature or NEAT, which is defined as the temperature signal change that is equivalent to the noise of the detector. For high sensitivity, a high fraction of the photons must be converted into electrical signal, and while the signal increases linearly with flux, the shot noise increases like the square root of the flux so that the sensitivity for background-limited images improves like the square root of the total integrated signal. The total integrated signal indicates a total number of photons collected over an integration time interval. Thus longer integration time intervals can increase the signal to noise ratio and provide higher sensitivity. However, in order to avoid a blurred or smeared image, the integration time for scanning arrays is limited to the time it takes motion of the image to cover approximately one-tenth of a pixel. So the integration times cannot be made arbitrarily long. For wide area imaging, at acceptable revisit rates, the integration time becomes very short. Thus, the sensitivity becomes poor.

One solution is to introduce multiple lines (banks) of linear arrays and then add the signal from each successive line with an appropriate time delay to produce the desired total integrated signal and sensitivity without image blur. Known in the art as Time-Delay-and-Integrate pixels (TDI), the approach has extended the capability of scanning imaging systems at the expense of increasing the complexity of a readout integrated circuit and optical system stability control. Advanced scanning imaging systems using TDI banks are disclosed by Goodnough and Tener in "Multi-bank TDI Approach for High-Sensitivity Scanners," filed on Aug. 22, 2008, and published as U.S. Publication No. 2010/0046853 on Feb. 25, 2010, the entire contents of which are hereby incorporated by reference, except for terminology inconsistent with that used herein. Though very high-speed scanning technology is possible (>30 kHz sampling rates for each line of sensors), as the area to be imaged becomes very large, the noise of the amplifier in each readout unit cell can become significant relative to the very small optical signal produced in the short integration time required to avoid blur. Thus the imaging system sensitivity becomes degraded. In addition, for wide-angle scanned imaging, as the rate becomes high and more TDI banks are required, it is often difficult to achieve good optical image flow regions aligned with the pixel array to avoid image blur.

To provide wide area coverage using two-dimensional (staring) focal plane arrays, the array must be pointed, e.g., by mounting to a gimbal or moving a platform to which the optics are fixed, then maintained in stable position relative to the scene while the signal is integrated. If the platform to which the gimbal is mounted is moving, the gimbal must turn to keep the scene steady (e.g., stabilized within a fraction of a pixel) during the integration time interval. After the integration time interval ends, the system should be stepped to point to an adjacent location for another snapshot.

The stepping can be achieved by various mechanical means, such as stepping the gimbal itself. Alternatively one can introduce a step-stare mirror which would typically slew (turn or slide quickly) and settle faster than the gimbal due to its lower mass. Another approach is to continuously scan the image and introduce a back-scan mirror in the optical path which stabilizes the image during integration and then returns to the starting position before the next integration.

In all such step-stare approaches, to avoid optical blur, it is advantageous if the image is stable to one tenth of a pixel or less during integration. Such step-stare mirrors must also be very flat and stiff to avoid image distortion. However, such flat stiff mirrors generally have greater mass than smaller or less stiff counterparts. The increased mass limits the rate such mirrors can be accelerated, decelerated and stabilized. Examples of advanced step-staring imaging systems are disclosed by Kasunic, Goodnough and Donohue in "Interlaced Focal Plane Array for Wide Area Surveillance," filed on Sep. 9, 2011, and issued as U.S. Publication No. 2012/0081511 on Apr. 5, 2012, the entire contents of which are hereby incorporated by reference, except for terminology inconsistent with that used herein. While able to cover very large areas, the revisit rates are limited by the step-stare slew-and-settle times; and, the step-stare mechanisms introduce optical imaging system complexity and cost.

One simplistic approach is to use a very large two-dimensional array of pixels with commensurately sized optical system. Such extremely large staring FPAs and optics can drive system costs beyond the limits of what can practically be put into the field. It was recognized that smaller staring FPAs that can be stepped over a scene (thus creating a high Ground-Pixel/Physical-Pixel or GP/PP ratio) can dramatically lower cost and SWaP (Size, Weight and Power) of such systems. However, such small staring arrays put more stringent constraints on the support structures and optical components used with such arrays. For example, all elements, such as a lens and a stepping mirror, in the optical path must maintain uniformity and consistency over the entire optical wavefront or there will be image distortion. Stepping mirrors must then be very stiff, increasing the mass and limiting the ability to quickly point, smoothly rotate, and then quickly point again (motion dynamics).

Furthermore, the stepping mechanism often involves large stepping mirrors that grow in size with higher altitudes and lower ground-sample-distance (GSD), which involves a smaller space between pixels on the ground. Lower GSD involves a larger focal length and, thus, a larger beam, and, thus, a larger mirror. Because the mirror size is roughly proportional to aperture size, and the inertia of these mirrors can grow as fast as the cube of its radius from the pivot, the stepping mechanism is often the key limit in image size and revisit times. Other optical chain mechanisms can be stepped but they similarly scale with aperture size, are inherently heavy, and/or have more limited angular step range.

SUMMARY

Embodiments relate to a system and a method for improving the data quality of images captured by focal plane arrays in scanning systems for both continuous scanning of a moving scene and multiple scans of a stationary scene. It was recognized that the fundamental limit in the step and point dynamics is the high mass of all of the optical elements. Consequently, in various embodiments, it is proposed to step and point using the smallest components of the system, such as the FPA array, whether a linear array or a two-dimensional (staring) array, or FPA and other low mass non-optical components, such as a motherboard.

In a first set of embodiments, a system includes a focal plane array (FPA), a support structure, an optical assembly, a flexing structure and a drive actuator. The FPA includes multiple picture elements (pixels), and is configured to capture an image incident on the FPA as image data during an integration time interval. The optical assembly is configured to form an image of a scene at the FPA. The flexing structure is mechanically coupled to both the support structure and the FPA, and is configured to allow the FPA to move relative to the support structure. The drive actuator is mechanically coupled to the FPA, and is configured to cause the FPA to move relative to the support structure.

In some of these embodiments of the first set, the image moves relative to the support structure and the actuator is configured so that movement of the focal plane array relative to the support structure compensates for movement of the image relative to the support structure. In various embodiments of these, the image is moving due to movement of a platform (satellite, aircraft, gimbal or some combination) which comprises or is fixed to the support structure, or due to movement of a scanning component (such as a rotating mirror or lens) in the optical assembly, or some combination.

In some embodiments of the first set, the actuator is configured so that movement of the focal plane array relative to the support structure causes a first portion of the focal plane array to capture an image of a scene for an integration time interval and subsequently causes a different second portion of the focal plane array to capture an image of the same scene for the integration time interval.

In some embodiments of the first set, the focal plane array comprises a first portion on which pixels are arranged on a first regular grid with a constant spacing and a second portion on which pixels are arranged on a different second regular grid with the constant spacing and offset from the first regular grid by less than the constant spacing and more than about one eighth of the constant spacing.

In some embodiments of the first set, the system includes multiple close proximity filters. A first proximity filter of the plurality of proximity filters is fixed over a first portion of the focal plane array. A different second proximity filter of the plurality of proximity filters is fixed over a different second portion of the focal plane array. In some of these embodiments, the first proximity filter passes only light in a first band of optical wavelengths and the second proximity filter passes only light in a different second band of optical wavelengths. In some embodiments, the first proximity filter passes only light having a first range of polarization modes and the second proximity filter passes only light having a different second range of polarization modes.

In various embodiments of the first set, the flexing structure is configured with only one degree of freedom parallel to the focal plane, or is configured to include two orthogonal linear degrees of freedom parallel to the focal plane, or is configured to include one rotational degree of freedom parallel to the focal plane, or some combination.

In some embodiments of the first set, the system includes a cryogenic cooling assembly (such as Dewar and cold head), and the focal plane array is cryogenically cooled inside a Dewar. In some of these embodiments, the flexing structure is configured to conduct thermal power to cryogenically cool the focal plane array.

In various embodiments of the first set, movement of the image relative to the motherboard is in a range from about 10 times a width of one pixel to about 400 times the width of the pixel, or the integration time is in a range from about 0.1 millisecond (ms, 1 ms=$10^{-3}$ seconds) to about 10 ms, or some combination.

In a second set of embodiments, a focal plane array (FPA) includes a readout IC and a detector layer. The readout IC includes multiple readout elements arranged on an integrated circuit in a first regular grid with constant spacing. The detector layer includes multiple detector elements. In a first portion of the detector layer, detector elements are arranged on the first regular grid. In a second portion of the detector layer, detector elements are arranged on a different second regular grid with the constant spacing and offset from the first regular grid by less than the constant spacing and more than about one eighth of the constant spacing. The FPA is configured to capture an image incident on the plurality of detector elements as image data at the plurality of readout elements.

In some embodiments of the second set, the FPA includes a corresponding multiple of readout contacts, each readout contact centered on each readout element. The FPA also includes a corresponding multiple of detector contacts, each detector contact centered on each detector element. The FPA includes an insulating layer disposed between the readout IC and the detector layer. The FPA also includes a corresponding multiple of conductors configured to electrically connect one-to-one the readout contacts through the insulating layer to the corresponding detector elements by traversing any offset between a particular readout element and a corresponding particular detector element. In some of these embodiments, each readout contact is an Indium bump.

In a third set of embodiments, a method includes causing an optical assembly to point at a scene, wherein the optical assembly is configured to form an image of a scene at a focal plane array. The method also includes driving the focal plane array to move relative to the optical assembly.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1 is a block diagram that illustrates an example scanning staring array system, according to one embodiment;

FIG. 2 is a flow diagram that illustrates an example method for producing one or more images with a scanning staring array system, according to one embodiment;

FIG. 3A is a block diagram that illustrates an example scanning staring array system, according to another embodiment;

FIG. 4A is a block diagram that illustrates an example flexing structure for a scanning staring array system, according to another embodiment;

FIG. 4H and FIG. 4I are graphs that illustrates example advantages of silicon flexing structures, according to an embodiment;

FIG. 10C is a block diagrams that illustrates use of multiple example close proximity polarization filters for scanning staring FPAs, according to an embodiment;

DETAILED DESCRIPTION

Figure 3B:
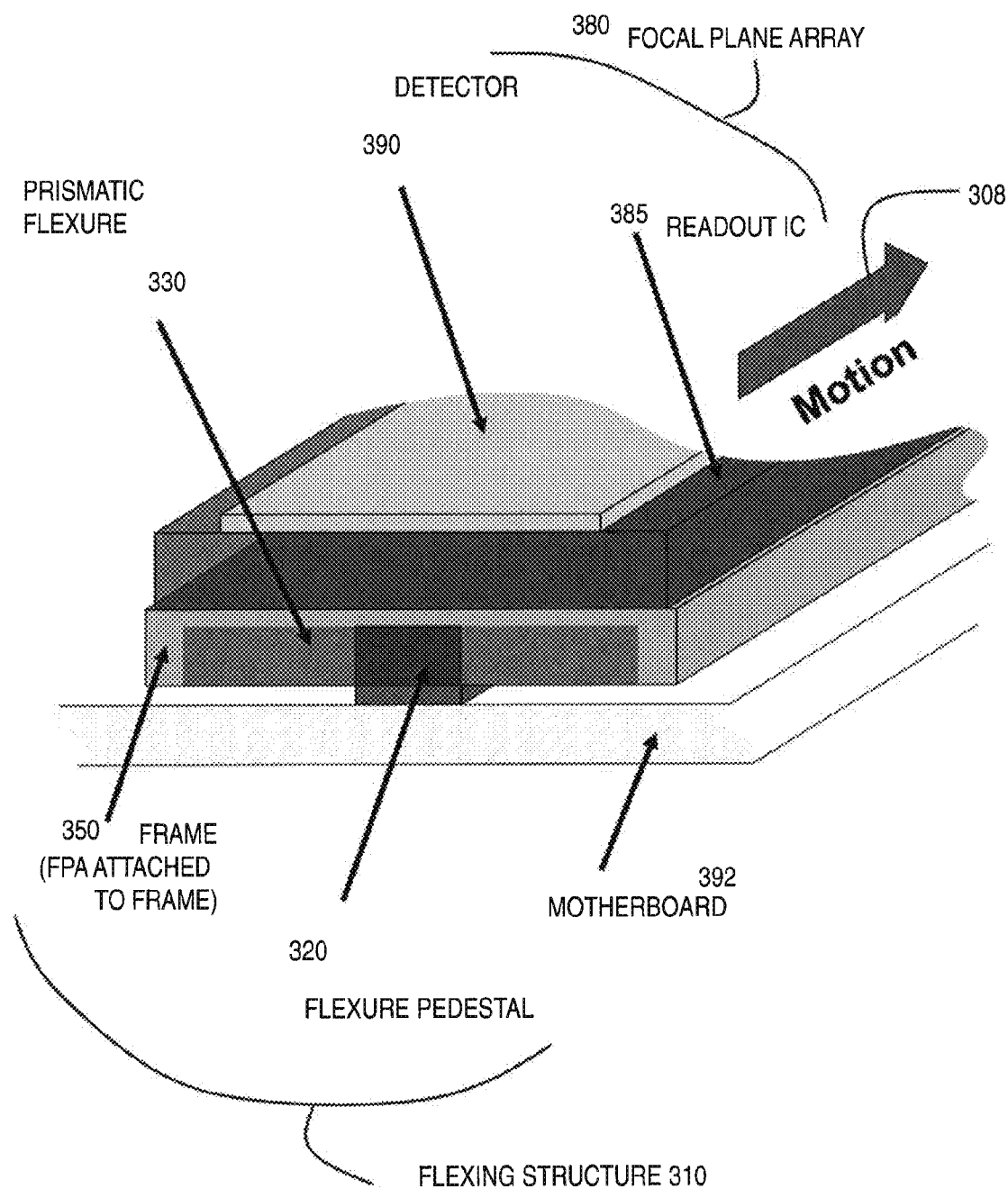
FIG. 3B is a block diagram that illustrates n example focal plane array (FPA) assembly for a scanning staring array system, according to an embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As used herein optical waveforms refer to electromagnetic waves having wavelengths at or near the visible wavelengths and include ultraviolet (UV), visible, and infrared (IR). An optical device is any device that operates on optical waveforms and includes a lens, mirror, waveguide, fiber, gradient refractive index (GRIN) device, filter, beamsplitter, source, laser, detector, free air or vacuum path, stop, or iris, among others, alone or in any combination.

While many examples are described in the context of infrared imaging and movement of a FPA alone, embodiments are not limited to this context. For example, other embodiments are practiced at any electromagnetic wavelength small compared to the pixel size. In other embodiments, the FPA is not moved alone but includes moving any low mass components of the system (compared to the optical components) in addition to the FPA, such as one or more chip sets or a motherboard or one or more close proximity filters or one or more electrical or thermal connectors, alone or in any combination. For example, in some embodiments, a detector mask that provides a black coated shield over the FPA/MB is included to only allow openings over the pixel arrays and avoid unwanted stray light reflections. It is used on the larger sized assemblies. In some embodiments, the black coated shield is moved with the FPA as part of the low mass moveable assembly.

Overview:

FIG. 1 is a block diagram that illustrates an example scanning staring array system 100, according to one embodiment. The system 100 includes a support structure 101, such as a gimbal or moving or stationary platform like a tower or aircraft, or some combination. The support structure 101 is rigidly connected to an optical assembly 160 and one or more components of a detector assembly. The optical assembly 160 includes one or more optical devices, and is configured to generate an image of a scene 190 at one or more focal planes. The scene 190 is a physical object to be imaged, such as a portion of the surface of the Earth, or a volume of sky, and is depicted for purposes of illustration but is not part of the system 100.

The detection assembly includes a focal plane array (FPA) 110 and one or more devices that provide various support functions, such as a motherboard 130, components of a cooling system such as cold head 140 and Dewar 150, as well as other devices, not shown, such as one or more electrical power sources, and other components of the cooling system, other data processing systems, and communication systems. For some applications, such as those involving IR imaging, the FPA should be kept at extremely low temperatures so that the cold head 140 should be in the vicinity of the FPA and both should reside inside the Dewar 150. Cooling is delivered to the FPA through the motherboard 130 or a thermal conductor. Electrical power and signals are delivered to the FPA through or via the motherboard 130 or one or more electrical conductors.

A pixel on the FPA detects light from a pixel field of view 192 on the scene 190 through the optical assembly 160. In a continuous scanning mode, the scene 190 moves during the integration time interval with respect to the optical system by a relative movement 194. This can be due to movement of the support structure 101, e.g., on a gimbal or a moving platform, or due to a scanning component within the optical assembly 160, such as a rotating mirror, or some combination.

The example movement depicted in FIG. 1 shows a horizontal translation and vertical rotation; though in many embodiments the vertical change is negligible. As a result, the portion of the scene formerly in field of view 192 has moved to the position 196 for the same field of view at the end of the integration time. If no compensation is made for such movement, the new position 196 is in the field of view of a different pixel indicated by the dashed cone connecting field of view 196 to the FPA 110. The image generated at the focal plane by the optical assembly 160 has moved by the image movement amount 198 (also called an "optical image flow") relative to the optical assembly 160 and support structure 101 during the image integration time.

In a multiple capture mode, such as measurements made of the same scene with multiple filters or dithering multiple FPAs, even if the scene is not moving, the optical assembly or support structure must be pointed for one frame to form an image on a first FPA with the proper dithering or filters and then pointed differently to form the image on a different FPA with different dithering or filters. In this mode, the pixel field of view 192 for one pixel on a FPA must also be viewed by a different pixel on the same or different FPA with different dithering or filter. This may involve repointing the support structure (e.g., my moving the platform or operating a gimbal) or moving a component to change the optical path through the optical assembly 160. Such movement is similar to that required for the continuous scan mode.

In general, very large area FPAs become exponentially more expensive due to low yield resulting from likelihood of defects landing on the active areas and high processing and materials cost as there are relatively few readout and detector die per processed wafer. Approaches to reduce cost and size, weight and power (SWaP) consumption have been developed by imaging multiple pixels on the ground with each physical pixel on the focal plane array. Because the integration time (on the order of about 5 milliseconds, ms, 1 ms=$10^{-3}$ seconds) is a fraction of the revisit time (about 200 ms for a frame repeat rate of 5 Hz) many ground pixels can be imaged per physical pixel as long as ground pixels can be successively imaged and captured by the FPA physical pixel without significant blur, typically less than 0.1 pixel of motion during the integration. These approaches include stitching images together from smaller focal planes, e.g., step stare such as U.S. Publication No. 2012/0081511 and scanning linear arrays with time delay and integrate (TDI) to accumulate the desired signal to noise while using short snapshots to avoid image blur as disclosed in U.S. Publication No. 2010/0046853, the entire contents of each of which are hereby incorporated by reference as if fully set forth herein, except for terminology inconsistent with that used herein.

In past approaches, additional components were added to the optical assembly 160 to compensate for the image movement of a continuous scan mode or needed in multiple capture mode. But such compensating components must provide an image stabilizing backscan motion for all frames, with a snap back to a starting position and glide forward for the next frame, for continuous scan mode, or snap between two or more positions for a multiple capture mode. As indicated above, the dynamics of moving the typical components preclude a cost effective or practical mechanism for providing the desired function at revisit rates that make the best use of the FPA frame rate.

Some of the lowest mass components of the detection system include the FPA 110 and motherboard 130. According to various embodiments, rather than moving the massive support structure 101 or relatively massive components of the optical assembly 160 to stabilize an image at the FPA 110, the FPA itself and zero or more other components, with low mass compared to the optical components of optical assembly 160, are moved to stabilize the image at the FPA 110. Moving the FPA over large distances (especially in a cryogenic environment) would be prohibitive. Fortunately, a continuous scan mirror, or moving the gimbal's line-of-sight (LOS), or even platform (e.g., vehicle) motion can provide the large-scale, continuous motion at the desired (often constant) velocities. What is then advantageous, is a mechanism to stabilize the image during the small integration time, and this movement can be very small, on the order of about 10 to about 400 pixels. The faster the FPA frame rate, the shorter the integration time, then the shorter the desired movement of the FPA. Multiple overlapping images of the scene can be registered and added together to produce the desired composite integration time and hence sensitivity To enable controlled movement of the FPA and any other low mass components, a flexing structure 120 is inserted between the low mass movable components (called herein the low mass moveable assembly) and the other components of the detection assembly which are rigidly connected to the support structure 101. The flexing structure 120 is thus mechanically coupled, directly or indirectly, to both: the support structure 101 with all components rigidly attached thereto; and the FPA 110 with all low mass components rigidly attached to the FPA. In the illustrated embodiment, the flexing structure 120 is disposed between the motherboard 130 and the FPA 110, in which the FPA 110 alone comprises the low mass moveable assembly. Moving the FPA to compensate for image movement (optical image flow) involves very precise motion. While the image is always smallest at the focal plane, the small size of the pixel (on the order of 10 micrometers, μm, also called microns, 1 μm=$10^{-6}$ meters) means that the approximately 0.1 pixel accuracy involves very precise position control during the motion, and from cycle to cycle. Flexure systems are well known in the art to provide reliable fatigue-free motion. For example, comprehensive engineering description is given in "Compliant Mechanisms: Design of Flexure Hinges" by Nicolae Lobontiu, 2003, CRC Press LLC, Library of Congress Card Number 2002073795. In various embodiments, any known and suitable flexure system is used in the flexing structure 120.

It is advantageous for the flexing structure to avoid rubbing surfaces. For many applications, tens of billions of cycles are required without degradation and particle generation. Any springs, thermal contacts, and electrical contacts must survive tens of billions of cycles without degradation. Spring constants that represent resistance to motion should not be too high or involve too much power and/or added mass in an actuator to move the flexing structure 120. Such increased power could possibly cause deformation of the FPA. Furthermore, the stiffness of the combined flexing structure and drive actuator is advantageously chosen to keep the resonant frequency high enough to both perform the required motion dynamics without amplification (e.g., above the sampling rate) and be above any system vibration frequencies. In a cryogenic environment, removing the heat is inefficient, 20:1 or more so that 0.25 W inside requires 5 W power outside. Also, if the FPA temperature is unstable (even 1° C. change can be a problem) it can cause the FPA image correction to change. Thus, increased power consumption can generate increased temperature and degrade the image data quality.

In some embodiments, it is advantageous to prevent changes is focus distance (Z dimension) on any part of the FPA beyond certain low limits. Further, in some embodiments, any X-Y rotation in the plane parallel to the focal plane or movement in an unintended direction is disadvantageous because such movement can create image blur. Thus, in some embodiments, the flexing structure is configured to constrain the movement of the low mass moveable assembly to one degree of freedom, e.g., in the direction of scanning only. In other embodiments, more degrees of freedom are allowed, including two linear degrees of freedom and one rotational degree of freedom, all parallel to the focal plane, and a full six degrees of freedom (three translational degrees of freedom and three rotational degrees of freedom) for full three dimensional motions. Any flexing structure known in the art with suitable characteristics, described below, may be used in various embodiments.

In some embodiments, the flexing structure includes one or more electrical conductors for electrical power or electrical signals, or both, to pass between the components in the low mass moveable assembly to components fixed to the support structure. Similarly, in some embodiments that involve cryogenic cooling, the flexing structure is composed of or includes one or more thermal conductors for thermal power to pass between the components in the low mass moveable assembly to components fixed to the support structure for cooling one or more components of the low mass moveable assembly. A thermal conductivity path from FPA to the cryogenic cooler is established in some embodiments so that the FPA requires a relatively low temperature rise above the cooler temperature (1-5 Kelvins) to dissipate its thermal heat load. It is advantageous to make electrical connections without affecting the drive dynamics, or inducing torque or other non-planar movement.

In other embodiments, one or more such electrical or thermal conductors or some combination are included as flexible conductors 128 (FIG. 1) or flexible electrical connections 466 (FIG. 4A), so that the low mass moveable assembly can move relative to the support structure without noticeable resistance or damage to the conductors 128. Room-temperature FPAs involve removal of FPA thermal loads and electrical connections. For cryogenic FPAs, these problems are compounded due to low-cooling efficiencies of a vacuum. This places a premium on any added thermal loads. In both cases, for moving FPAs, it is advantageous that these thermal and electrical connections be flexible and have a very high lifetime (e.g., expected life to survive a large number of cycles in the tens of billions). In some embodiments interconnects are configured on the end in line with the motion. This makes it easier to have the flex "curling" in a strain-relief shape with each flex.

While the flexing structure 120 allows the low mass moveable assembly to move relative to the support structure 101 and optical assembly 160, it does not drive movement in the allowed degree or degrees of freedom. A drive actuator 122 is included that is mechanically coupled to the FPA, either directly or indirectly through the flexing structure or one or more other components of the low mass moveable assembly. This drive actuator is configured to move the low mass moveable assembly, including the FPA, relative to the support structure, e.g., to compensate for image movement during a continuous scan, or to change the pixel of the FPA that views the same field of view 192 on the scene 190. In the illustrated embodiment, the drive actuator is anchored to the support structure, e.g., at the motherboard 130, using actuator mount 123.

Feedback for precise control of the actuator is provided in some embodiments, by a movement sensor 124, depicted in FIG. 1 as attached to the flexing structure 120 so that no modifications are required to the FPA or motherboard. The actuator is controlled to produce the desired relative movement of the FPA using a processor, such as the motherboard 130, or an offsite chip set as depicted below with reference to FIG. 12 or computer (not shown). Information about the scene, the distance to the scene, the components of the optical assembly 160, the movement of the support structure, or the output of the movement sensor 124, or some combination, is used to determine the desired control signals to send to the drive actuator. Any method to determine the desired motion may be used. Any sensing mechanism may be used in movement sensor 124 to control velocity and position accuracy. Capacitive, side-looking interferometer, or even an on-FPA sub-array sensor, or some combination, are used in various embodiments. Repeatability and stability of the sensing mechanisms with age and thermal cycles is a consideration along with any added power demand or mass increases. In some embodiments, a method is to drive the motion open-loop and use the image to determine the correct waveform. If the motion is precise and reproducible this is possible. In some embodiments, closed loop FPA motion is used to partially compensate for the optical system stability determined by other sensors. This can reduce gimbal/optics stabilization requirements and cost.

In some embodiments, the desired frame rate is on the order of 100 Hz, i.e., about one hundred frames per second, to above about 1 kiloHertz (kHz, 1 kHz=$10^3$ Hz). A drive actuator is selected that is capable of moving the mass of the low mass moveable assembly, and the moving portion of the flexing structure, and overcome the elastic resistance (spring constant) of the flexing structure to a desired distance (on the order often to one hundred pixels and on the order of 0.1 to 1 millimeter, mm, 1 mm=$10^{-3}$ meters) in the desired time (on the order of 1 to 10 milliseconds, ms, 1 ms=$10^{-3}$ seconds). For sufficiently low mass and resistance, many piezo actuators are available that are suitable as drive actuator 122 because they provide very precise motion without hysteresis. For example, a mechanically-amplified piezoelectric driver is disclosed by Barillot in U.S. Pat. No. 6,927,528 "Piezoactive Actuator with Dampened Amplified Movement," issued Aug. 9, 2005, the entire contents of which are hereby incorporated by reference as if fully set forth herein, except for terminology inconsistent with that used herein. Such a piezo actuator is available commercially from CEDRAT™ Technologies of Meylan, France.

In addition, it is desirable that the flexing structure not have a resonance frequency at the rate that the flexing structure is moved from one frame or capture event to the next, e.g., in the range from about 10 Hz to about 5000 Hz, and preferably in a range from about 120 hz to about 1000 Hz. It is further advantageous for the resonant frequencies of the flexing structure in any dimension to be well above any driving frequency or vibration frequencies of the system or any component therein.

With such components in place, during continuous scanning, the FPA 110 is moved to the position of the dotted lines during the integration time so that the same pixel receives at least about 90% of the light collected from the field of view 192 as it moves to position 196 over the integration time interval. Similarly, for multiple frame capture mode, the FPA is moved after an initial integration time interval to the position of the dotted lines so that an intended second pixel receives the light collected from the field of view 192 during the subsequent integration time interval.

FIG. 2 is a flow diagram that illustrates an example method 200 for producing one or more images with a scanning staring array system, according to an embodiment. Although steps are shown in FIG. 2 as integral blocks in a particular order for purposes of illustration, in other embodiments one or more steps, or portions thereof, are performed in a different order, or overlapping in time, in series or in parallel, or are omitted, or one or more additional steps are added, or the method is changed in some combination of ways.

In step 201, the optical assembly 160 is pointed at a scene, e.g., scene 190. This is accomplished by leaving the support structure where it is, or moving the support structure by moving a platform on which the support structure is attached, or by moving a gimbal to which the support structure is fixed, or by moving an optical component, such as a mirror, within the optical assembly 160 or some combination.

In step 211, the focal plane array is driven to move relative to the optical assembly fixed to the support structure 101. In an example embodiment, step 211 includes steps 213, 215, 217 and 219.

In step 213, it is determined whether a moving image of a scene is to be captured. If so, then control passes to step 215 for continuous scanning mode. If not, then control passes to step 217 for multiple capture scanning mode.

In step 215, the movement of the FPA is determined to compensate for movement of an image of the scene relative to the optical assembly rigidly connected to the support structure. For example, based on the rotation speed of the gimbal or scanning mirror or the combination, the angular field of view of each pixel, and the integration time, the number of pixels traversed from start to end of the integration time interval is computed. Based on the pixel size in the FPA, the distance to traverse during the integration time is computed, and the speed of the FPA is determined for this interval. For the return, the difference between the integration time Tint and the frame time Tframe from the start of one frame to the next, is computed as the reset time Treset. The signal is determined that causes the drive actuator to stop moving the FPA, reverse movement, return to the starting position and reverse direction again during the reset time Treset. Step 215 is performed by a processor on the motherboard 130 or elsewhere in the system, such as a chip set depicted in FIG. 12. In cryogenic applications, it is advantageous to perform many computations on a warm side (whether inside or outside the Dewar) to conserve cooling power. In the illustrated embodiment, the readout IC produces digital data; but, in other embodiments, the FPA produces analog signals that are digitized external to the FPA on the motherboard or externally. In various embodiments, the control signals are determined based on a position sensor, prior calibration tables determined in initial testing or from image based calibrations, or some combination. Control passes to step 219.

In step 219, the drive actuator 124 is controlled to move the flexing structure (or FPA directly) to achieved the desired movement of the FPA. For example, drive signals are sent to the drive actuator 124 from the processor, and received at the actuator 124. As a result, the actuator drives the flexing structure or some member of the low mass moveable assembly, such as the FPA.

If it is determined in step 213 that a multiple capture scanning mode is being used, then in step 217 the movement of the FPA is determined to integrate at one set of pixels then move to capture the same scene at a different set of pixels and integrate at that new set of pixels. For example, the FPA is kept stationary for a first integration time interval, then during a frame reset time moved a distance corresponding to the next set of pixels to capture the same scene, then kept stationary again for a second different or identical integration time interval. Control then passes to step 219, as described above to send the signals that cause the actuator to move the FPA as desired.

In some embodiments, all applications are to capture a moving image of a scene; and, step 213 or step 217 or both are omitted. In some embodiments, all applications are to capture a stationary scene with multiple different pixels; and, step 213 or step 215 or both are omitted.

In step 221, based on the digital image data collected from the FPA moved according to step 211, one or more digital images are produced. This step is performed by some combination of the motherboard and chips sets or processors separate from the detector assembly. In some embodiments, the digital image represents the stabilized image of a continuous scan. Overlapped portions of the continuous scan or scenes captured multiple times by different pixels are presented in various embodiments, as an image with sub-pixel resolution accomplished by dithering, or as multispectral images representing two or more color bands, or a set of polarized images representing two or more polarization modes. The system designed to accomplish such images are described in more detail below with respect to certain embodiments.

Example Embodiments

In some embodiments, a silicon MEMS shuttle is used as the flexing structure underneath the FPA and above the motherboard. A center pedestal of the flexing structure is attached directly to the motherboard and the outer frame of the flexing structure is attached directly to the FPA. The frame and pedestal are linked by at least one prismatic beam assembly of notch flexures which allow fatigue-free linear motion in the desired direction while remaining stiff in all other scan axes (the other 5 degrees of freedom, DOF). The flexing structure is selected so that the spring constant for the other 5 DOFs result in resonant frequencies well above any system vibration frequencies (obviating any noticeable movement in those degrees of freedom).

FIG. 3A is a block diagram that illustrates an example scanning staring array system, according to another embodiment. A staring FPA 380 has a field of view 301 on a scene. Each pixel field of view 302, often referred to as the iFOV, is being swept over the scene with movement 304 by some method, such as platform motion, gimbal motion or a scan mirror in the optical path through the optical assembly (which includes lens 306), or some combination. The FPA 380 is packaged within a vacuum Dewar package 305 to avoid condensation due to cooling to cryogenic temperatures, nominally in the 70 Kelvin to 200 Kelvin range for an infrared FPA. The vacuum also minimizes the thermal load associated with convection between the cryogenic FPA cold head and the room temperature Dewar walls. In the illustrated embodiment, the FPA 380 is continuously moving in a cyclic manner in the Dewar. The integration of the optical signal occurs while the FPA motion 308 is in sync with the image movement on the focal plane (the optical image flow), thereby eliminating blur and the associated image quality reduction. The FPA 380 is being moved on a flexing structure (indicated by gray variations in FPA and illustrated in FIG. 3B, below) by a drive actuator (illustrated in FIG. 4A, below) in the direction 308 to stabilize the image during integration.

FIG. 3B is a block diagram that illustrates an example focal plane array (FPA) assembly for a scanning staring array system, according to an embodiment. As is standard in the art, the FPA 380 includes a readout integrated circuit 385 which has been hybridized or electrically bonded to a matching detector array 390. For an infra-red staring FPA, the detector is often fabricated from InSb, HgCdTe, InAlAsSb, InGaAs and other direct-gap compound semiconductors. The FPA 380 is mounted on a micro-electrical mechanical system (MEMS) flexing structure 310 disposed beneath the FPA 380 and enabling precise linear translation in one direction 308. The FPA 380 is bonded to a frame 350 of the flexing structure 310, which is mechanically coupled by sets of prismatic (uniform cross section) flexure beams (called flexures herein) 330 to a flexure pedestal 320 of the flexing structure 310. While uniform cross section is advantageous for processing simplicity, in other embodiments, the beams do not have uniform cross section. The flexure pedestal 320 is bonded to a Motherboard 392 which is thermally grounded to a cryogenic cooler cold head inside the Dewar. In other embodiments, the pedestal is not integral to the flexure assembly, but bonded between the flexure and the motherboard, which may be easier to manufacture. The frame 350 can be moved with low resistance force in the direction 308 of motion but is very stiff in other directions, ensuring precise compensation for image movement during integration.

FIG. 4A is a block diagram that illustrates an example flexing structure 400 for a scanning staring array system, according to another embodiment. In this embodiment, a silicon flexing structure 400 uses six sets of four prismatic flexures, each set called a prismatic flexure-quad assembly 430. The embodiment includes an integrated capacitance position sensor 440, a piezoelectric drive 460, as drive actuator 122, and flexible electrical interconnects 466 from the frame to the motherboard 392. In various other embodiments, a position sensor is disposed off the flexure on the motherboard, or within or sensing the piezo driver. The design of prismatic flexures is presented in detail by Shao Hongzhe in "Design of a Family of Ultra-Precision Linear Motion Mechanisms," Journal of Mechanisms and Robotics, Volume 4, November 2012, which gives a detailed analysis of approaches for highly precise flexures for linear motion. Piezoelectric drive 460 provides very precise motion without hysteresis, and can also be fixed with high holding force, enabling the FPA to be used in both scanning modes and fixed for traditional staring modes.

Six prismatic flexure-quad assemblies 430 in a symmetric configuration are used to mechanically link the frame 450 with the Pedestal 420, and thus constrain the motion to linear travel back and forth along one degree of freedom. Length of flexures are advantageously determined by maximum rotation allowed to not exceed flexure material fatigue or failure stress. For silicon, material failure occurs at about 1 GigaPascal (Gpa, 1 Gpa=$10^9$ Pascal). The four arm group ensures linear motion without tension as the free floating bar end moves slightly in as it flexes. The thinner the flexure joint, the lower the stress for a given rotation angle. However, the thermal impedance increases as the flexure is made thinner, and thermal impedance also scales inversely with the number of flexure groups. So more flexure groups with lower rotation give lower thermal impedance but require higher drive force. One can also reduce the silicon wafer thickness to reduce force, but thermal impedance is increased accordingly. So there is a balance in design, and one would also like to keep the footprint close to the FPA to save space. With a 1° C. rise, 3 N force, the illustrated embodiment does provide a useful balance. Depending on the space available on the Motherboard 392 many other configurations for the flexing structure are possible. When placed on opposing sides of the pedestal, prismatic flexure-quad assemblies 430 ensure linear travel of the frame 450 and the FPA 380 attached to the frame 450.

The silicon prismatic flexure-quad assemblies 430 also provide the thermal path from the FPA 380 on one side to the motherboard 392 on the other side, in this embodiment. Also identified is the range of motion S 432 available in each direction (half the total range of motion 2 S) for the one degree of freedom from the neutral configuration of the prismatic flexure-quad assembly 430 configuration depicted. To deflect the frame in either direction along the one degree of freedom, force has to be applied and maintained by the piezoelectric drive 460. To move the distance in a given time, sufficient force must be available from the drive 460. The range of motion allowed by this flexing structure is up to more than about 0.6 mm for the illustrated silicon prismatic flexure beams.

Figure 4B:
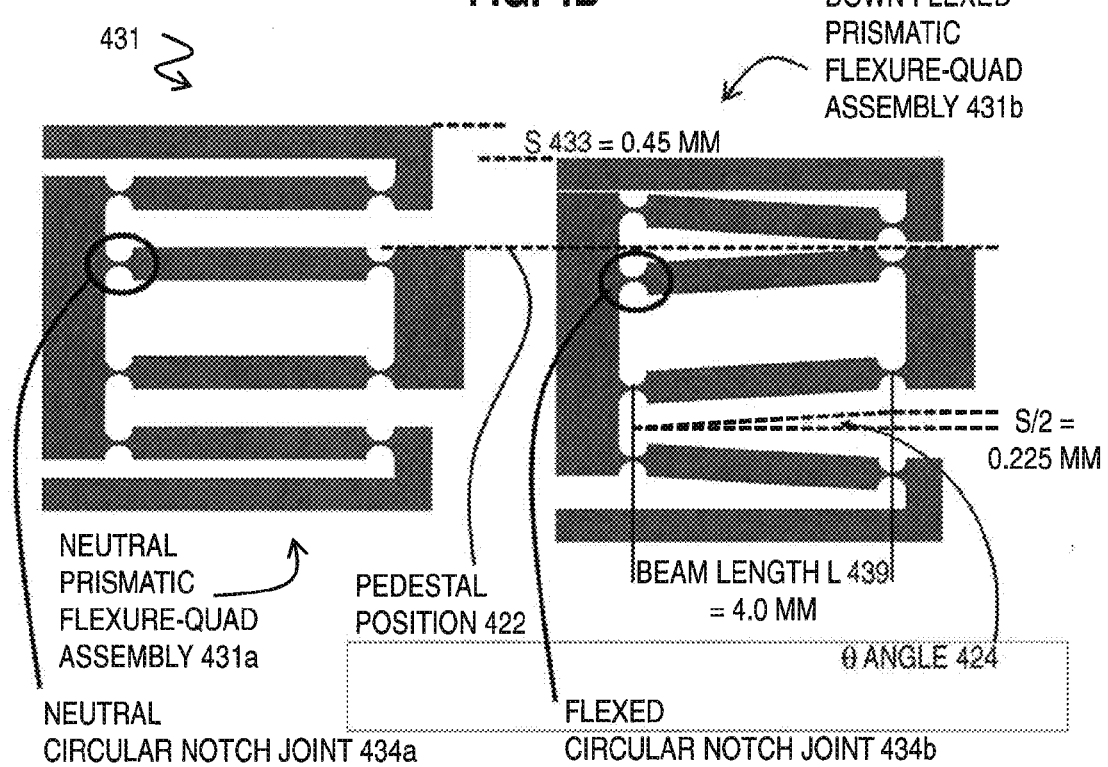
FIG. 4B is a block diagram that illustrates an example flexing of a flexure assembly in a flexing structure, according to an embodiment.

FIG. 4B is a block diagram that illustrates an example flexing of a flexure assembly 431 in a flexing structure, according to an embodiment. FIG. 4B shows a slightly smaller embodiment and the motion of one of the prismatic flexure-quad assemblies 431 at a time when the stage motion in the linear region is in sync with the image movement (optical image flow) over the motherboard. The prismatic flexure-quad assembly 431 is shown in a neutral configuration 431a and an extended down-flexed configuration 431b in one direction of the one degree of freedom. FIG. 4B shows the location of a neutral circular notch joint 434*a* and the same joint as a flexed circular notch joint 434*b* in the extended down-flexed configuration. The range of motion S 433 in one direction of the one degree of freedom (which is half of the full range of motion between down-flexed and up-flexed) for this embodiment has an example value of 0.45 mm, as opposed to the larger half range S 432 of as much as about 0.6 mm of the embodiment depicted FIG. 4A. The fixed pedestal position 422 is indicated. The length L 439 of the beams is 4.0 mm in the illustrated embodiment. The angle θ424 represents the bending of one prismatic beam at its joint which, at maximum angle θmax, accounts for half of the range of motion in this direction, with an example value of S/2=0.225 mm. The variable S 433 and angles θ and length L 439 are used in equations of stresses explained below. The values of θmax and S 433 and L 439 are related by Equation 1.

$$\theta max = \sin^{-1}(S/2L) \quad (1)$$

For the values of the illustrated embodiment, L=4.0 mm and S=0.45 mm, Equation 1 yields θmax=0.0625 radians (rad).

Figure 4D:
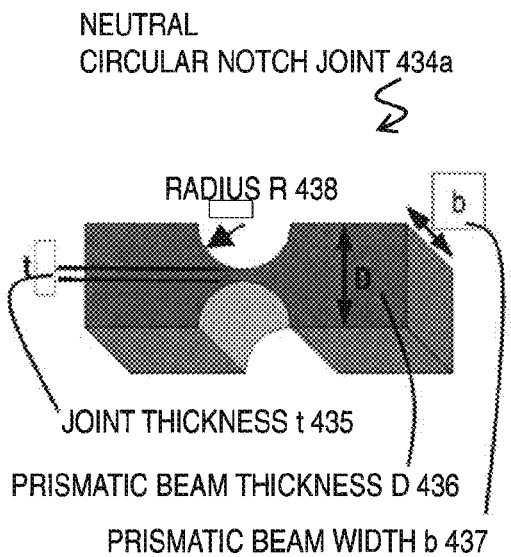
FIG. 4D and FIG. 4E are block diagrams that illustrates an example flexing of a joint in the flexure assembly of FIG. 4B, according to an embodiment.
Figure 4E:
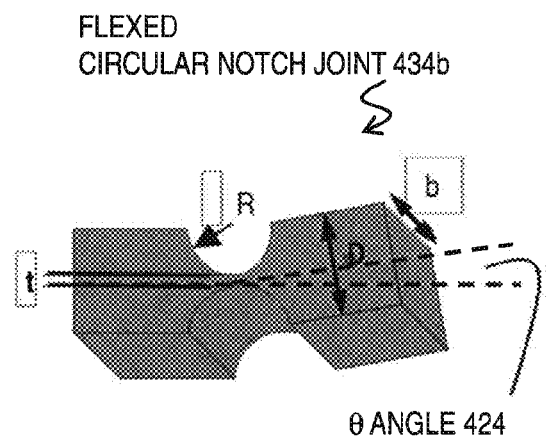
Figure 4C:
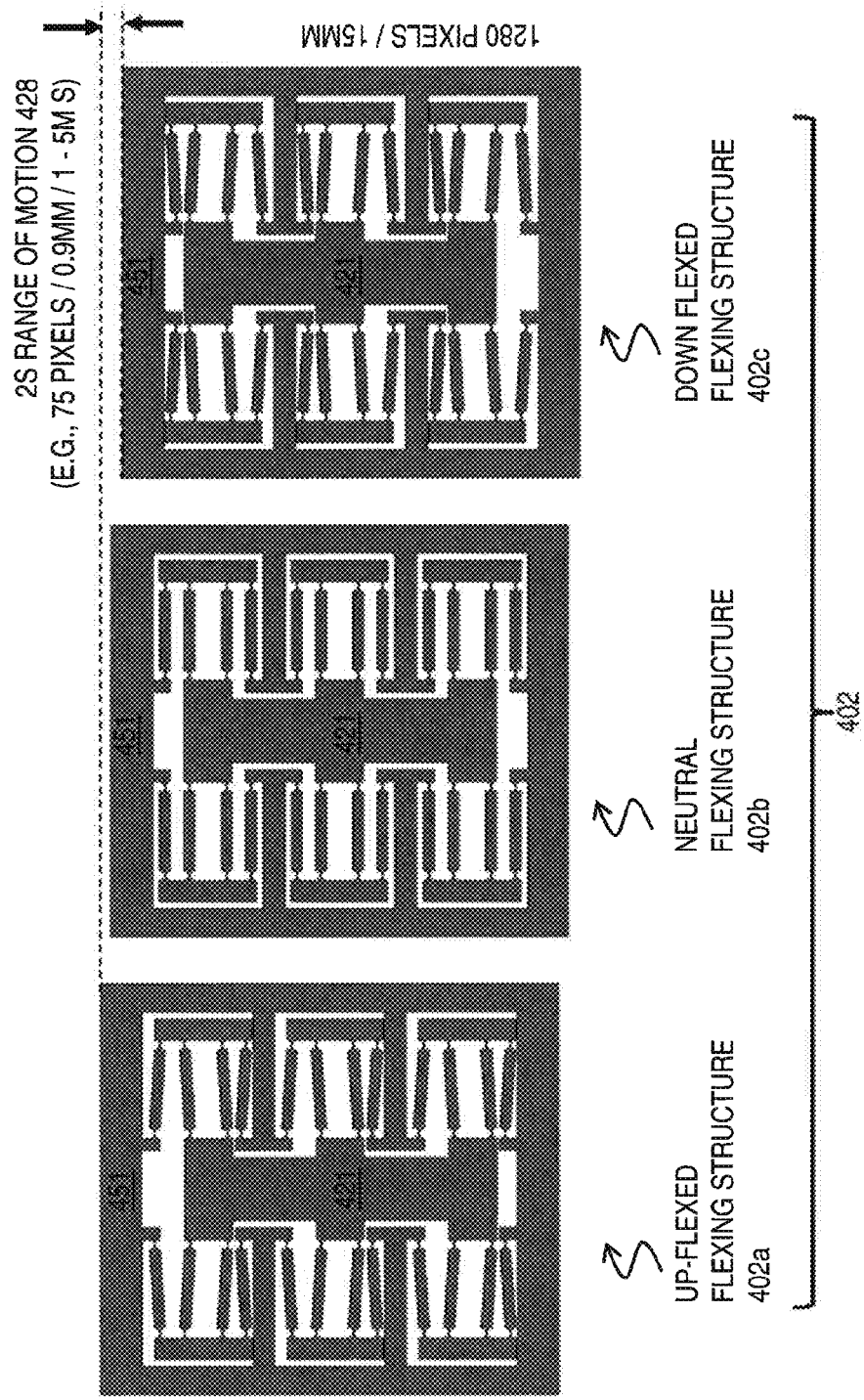
FIG. 4C is a block diagram that illustrates an example range of motion of a flexing structure, according to an embodiment.

FIG. 4C is a block diagram that illustrates an example range of motion of a flexing structure 402, according to an embodiment. This embodiment 402 uses the smaller deflection prismatic assemblies 431 of FIG. 4B. FIG. 4C shows the silicon flexing structure 402 in three motion states (configurations) including an up-flexed flexing structure 402*a*, a neutral flexing structure 402*b*, and a down-flexed flexing structure 402*c*. The outer frame 451 is shifted while the center pedestal 421 is fixed. The total range of motion, 2 S 428, is 0.9 mm. For a FPA with 1280 pixels per 15 mm in the flexing direction, the 0.9 mm corresponds to 75 pixels. The stress of such deflection can be computed. With example integration times of about 1 ms to about 5 ms, the acceleration and force involved in moving the FPA and frame 451 by the drive actuator, such as piezoelectric actuator 460, can also be computed. The focal plane array which is attached to the frame is removed for clarity.

FIG. 4D and FIG. 4E are block diagrams that illustrates an example flexing of a joint in the flexure assembly 431 of FIG. 4B, according to an embodiment. FIG. 4D shows the neutral circular notch joint 434*a* for the example neutral prismatic flexure-quad assembly 431*a*. FIG. 4E shows the flexed circular notch joint 434*b* for the example down-flexed prismatic flexure-quad assembly 431*b*. The joint configurations 434*a* and 434*b* are collectively referred to as joint 434 hereinafter. The prismatic beam has thickness D 436 and width b 437. Into the beam thickness D is cut a circular notch with a radius R 438 to form the joint. Cuts, on both sides of the beam, leave a thickness in the joint (joint thickness) t 435. The angle of flexing is θ424.

The equations which calculate the relationship between the joint stiffness, range of motion and material stress are given as Equations 2a, 2b, 3a and 3b.

$$K_{\theta zMz} = \frac{2EbR^2}{3} \cdot \frac{(2\beta)^{\frac{5}{2}}}{3\pi} \quad (2a)$$

$$\beta = \frac{t}{2R} \quad (2b)$$

Here $K_{\theta zMz}$ is the joint stiffness and E is the Young's Modulus. The range of motion is given by the maximum allowable stress σ for the material.

$$\sigma = \frac{4ER^2}{f(\beta)t^2}(1+\beta)^{9/20}\theta \quad (3a)$$

$$f(\beta) = \frac{3\pi}{(2\beta)^{5/2}} \quad (3b)$$

These equations for circular notch hinges were first introduced by Paros and Weisbord, "How to Design Flexure Hinges," Machine Design, pp. 152-156, 1965. A complete discussion is given in the book by Lobontinu, *Compliant Mechanisms: Design of Flexure Hinges*, CRC Press, Boca Raton, Fla., 2002. Any flexure joints that satisfy the strength and deflection desired, such as one or more flexure joints (hinges) described in these two references, may be used in other embodiments.

These equations are written into the spreadsheet and evaluated with the values from an example embodiment. This information is presented here in Table 1.

Table 1. Mechanical and Thermal Analysis of Example Prismatic Beams with Circular Notch Joints According to One Embodiment.

| INPUTS | | | |
|---|---|---|---|
| Material Properties | Description | Units | Value |
| Type | Si Circular Notch Flexure | | |
| E | Modulus of Elasticity | Gpa | 131 |
| E | Modulus of Elasticity | N/mm^2 | 131000 |
| $\sigma_{ultimate}$ | Ultimate Stress | Gpa | 7 |
| Joint Geometry | | | |
| t | Joint Thickness | mm | 0.05 |
| D | Beam Width | mm | 0.5 |
| b | Beam Depth | mm | 1 |
| R | Circle Radius | mm | 0.3 |
| Flexure Properties | | | |
| L | Arm Length | mm | 4 |
| s | Total Scan Movement | mm | 0.45 |
| $\sigma_{th}$ | Thermal Conductivity @150 K | W/mmK | 0.3 |
| $Q_{FPA}$ | FPA Heat Generation | W | 0.12 |
| CALCULATED OUTPUTS | | | |
| Mechanical | Description | Units | Value |
| β | Beta = t/2R | dimensionless | 8.33E−02 |
| f(β) | f(Beta) = 3π/(2β)^5/2 | dimensionless | 8.31E+02 |
| θ | Required Rotation Angle (+/−) | rad | 0.056 |
| σ | Induced Stress | Gpa | 1.324 |
| $\sigma/\sigma_{ultimate}$ | Stress relative to failure | % | 18.9% |
| $K_{rot}$ | Joint Rotational Stiffness | mm-N/rad | 9.46 |
| M | bending moment | mm-N | 0.532 |
| $F_j$ | Force per Flexure Joint | N | 0.266 |
| Fpiezo | Force to drive stage | N | 3.19 |
| Thermal Parameters | | | |
| L/$\sigma_{th}$bD | Flexure Beam Impedance | K/W | 22.667 |
| 2R/$\sigma_{th}$bt | Flexure Joint Impedance (x2) | K/W | 40 |
| $R_{th}$ | Impedance FPA to MB | K/W | 10.4 |
| ΔT | FPA temperature Rise | K | 1.3 |

A finite element analysis (FEA) of the structure gives an induced stress σ value of 1.394 gigaPascals (Gpa, 1 Gpa=$10^9$ pascals, 1 pascal=1 newton per square meter) and a force per joint Fj of 0.271 newtons (N) in close agreement with the values in Table 1, thus validating the analytical equations.

Figure 4F:
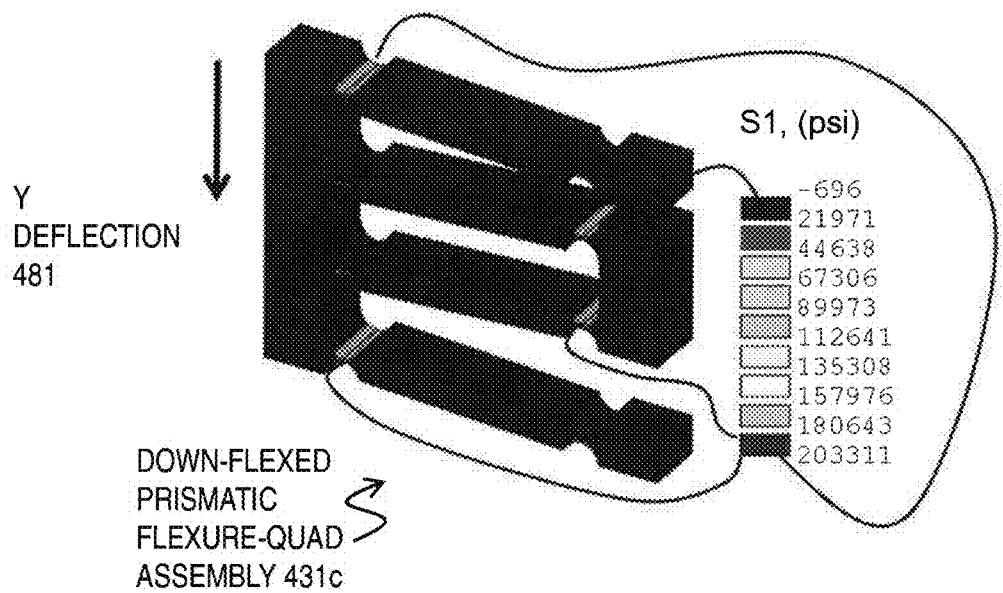
FIG. 4F and FIG. 4G are block diagrams that illustrates example stresses distributed in the flexure assembly of FIG. 4B, according to an embodiment.
Figure 4G:
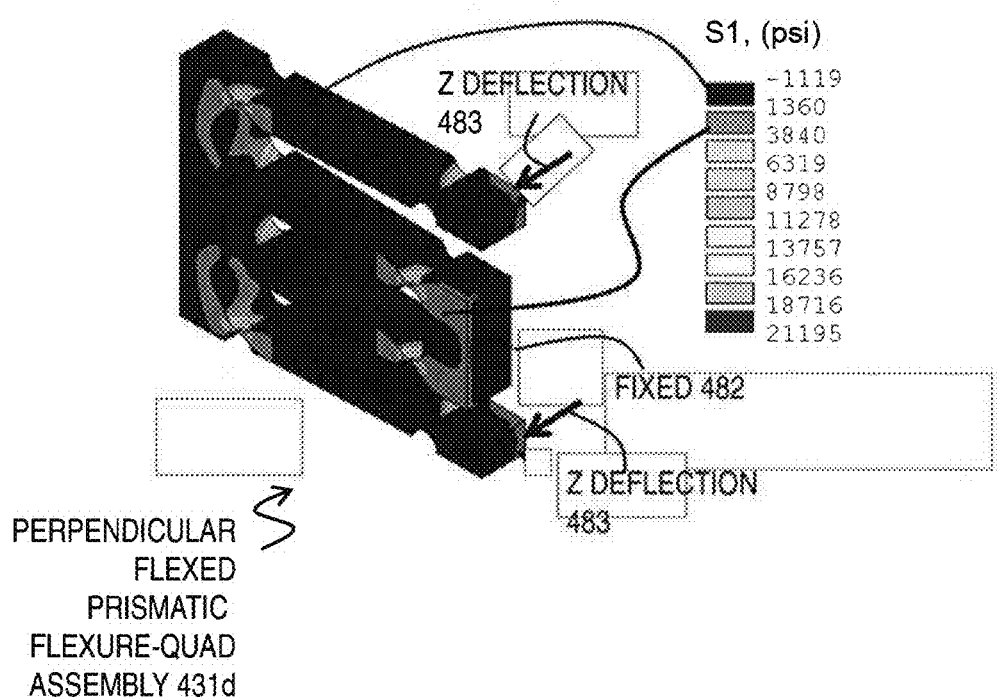

FIG. 4F and FIG. 4G are block diagrams that illustrates example stresses distributed in the flexure assembly of FIG. 4B, according to an embodiment. Here the maximum step size S is 0.45 mm, corresponding to 75 pixels for total range of motion of 150 pixels in an embodiment that is expected to use a range of only 100 pixels, for 50 pixel overscan allowed. For composite images, each FPA image is interpolated and matched to the prior image and stitched together to make the composite image using software as described in earlier referenced patents. Some pixel overlap (25 per side in the illustrated embodiment) help ensure there are no "gaps" in the composite image.

These stresses are determined using a finite element analysis (FEA) of the example silicon prismatic flexure-quad assembly 431. FIG. 4F shows the FEA-determined stresses in the intended direction of motion. The force per beam Fj is calculated to be 0.27 N with a maximum stress σ of 1.4 GPa (203,000 pounds per square inch, psi, on the greyscale S1), well below the 7 GPa to 20 GPa range of ultimate stress for rupturing single crystal silicon. Thus, the assembly can move +/−0.45 mm with no risk of crossover. Note that the computed resonant frequency of 303 Hz does not include stiffness of any drive actuator or the mass of the moveable assembly. The piezoelectric actuator itself is very stiff. It gets leveraged from the 10-40 μm of movement with a 0-100 V drive to the desired 1 mm motion using some kind of metal flexure as is standard in the nano-positioning-stage art. So the force is reduced, but the overall assembly remains lightweight and stiff. The full results are listed in Table 2. Note that the moving mass of 2.0 grams includes the 0.6 grams of the FPA. The force on the frame is based on the force of bending 12 beams; and, the total deflection of the entire flexing structure is 2 S, twice the deflection S of a single beam.

TABLE 2

Finite Element Analysis Results for Movement in Intended Direction.

| Description | Units | Value |
|---|---|---|
| 4 beam model deflection | mm | 0.45 |
| Deflection per beam | mm | 0.225 |
| Reaction force | lb | 0.12196 |
| Reaction force | N | 0.542478 |
| Force per beam | N | 0.271239 |
| Stiffness per beam | N/mm | 1.21 |
| Max stress | psi | 203311 |
| Max stress | Gpa | 1.402 |
| Total Moving Mass | gr | 2.000 |
| 24 beam system force | N | 3.255 |
| 24 beam system deflection | mm | 0.450 |
| 24 beam system stiffness | N/mm | 7.233 |
| Resonant Frequency | KHz | 0.303 |

FIG. 4G shows the FEA-determined stresses in one of the undesired degrees of freedom (a vertical, z, deflection). The stresses are a factor of ten to a hundred smaller; and the results are listed in Table 3. Deflection per beam, at about 0.005 mm, is negligible.

TABLE 3

Finite element analysis results for movement perpendicular to intended direction.

| Description | Units | Value |
|---|---|---|
| 4 beam model out-of-plane | mm | 0.01 |
| Deflection per beam | mm | 0.005 |

TABLE 3-continued

Finite element analysis results for movement perpendicular to intended direction.

| Description | Units | Value |
|---|---|---|
| Reaction force | lb | 0.27967 |
| Reaction force | N | 1.243972 |
| Force per beam | N | 0.621986 |
| Stiffness per beam | N/mm | 124 |
| Max stress | psi | 21195 |
| Max stress | Gpa | 0.146 |
| Total Moving Mass | gr | 2.000 |
| 24 beam system force | N | 7.464 |
| 24 beam system deflection | mm | 0.010 |
| 24 beam system stiffness | N/mm | 746.383 |
| Resonant Frequency | KHz | 3.1 |

Due to the relatively small mass of moving just the focal plane array, the resonant frequency for undesired degrees of freedom in Table 3 at 3 kiloHertz (kHz, 1 kHz=103 Hz) is well above the vibration excitation spectrum of most IR sensors (e.g., IR detection assemblies connected to support structure 101).

Figure 4I:
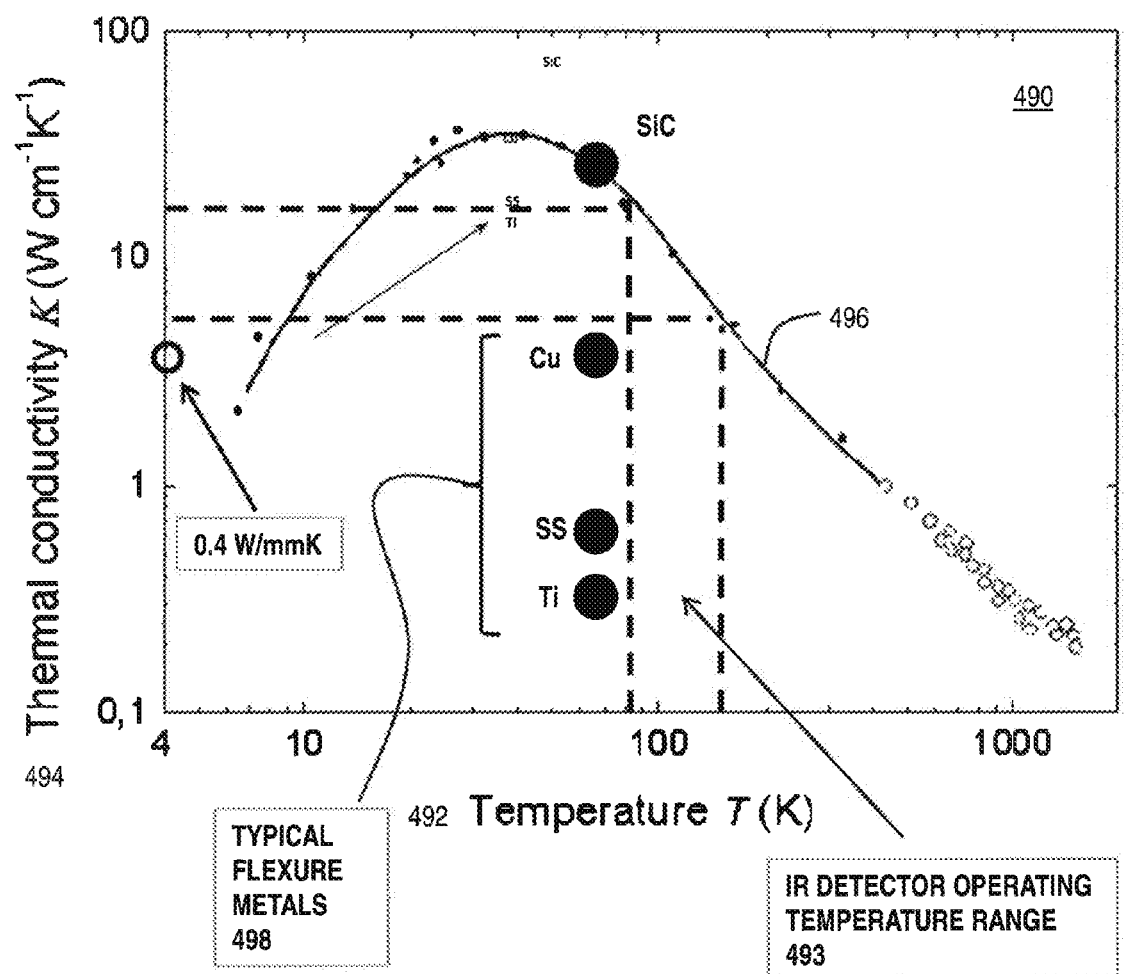

FIG. 4H and FIG. 4I are graphs that illustrate example advantages of silicon flexing structures, according to an embodiment. FIG. 4H is a graph 470 that illustrates example lifetime of silicon joints, according to an embodiment, The horizontal axis 472 indicates the life time before fatigue of single crystal silicon in number of cycles; and, the vertical axis 474 indicates applied stress in Gpa. The solid symbols 476a and 476b indicate published data showing the effects of applied stress on the lifetime of a silicon crystal. The higher the stress, the shorter the lifetime. For the induced stress a expected on the flexure joints, which is 1.3 Gpa in Table 1 indicated by dashed line 477, it can be seen that fatigue did not occur within $10^{11}$ cycles, effectively infinite in that it surpasses the expected lifetime of the imaging system. Thus silicon crystals are well suited mechanically as the material for the flexing structure 431.

FIG. 4I is a graph 490 that illustrates example thermal conductivity of silicon joints, according to an embodiment, The horizontal axis 492 indicates the operating temperature of the silicon crystal in Kelvin (K); and, the vertical axis 494 indicates thermal conductivity K in Watts per centimeter per Kelvin (W/cm K). The trace 496 indicates that the thermal conductivity of silicon crystals increases for about 10 K to about 40 K and then decreases at higher temperatures. For an IR detector operating temperature range 493 from about 80 K to about 150 K, the thermal conductivity of silicon crystals falls in a range from about 18 W/cm K to about 5 W/cm K. The solid symbols 498 indicate published data showing the thermal conductivity of other common flexure materials at similar temperatures, including copper (Cu), stainless steel (SS) and titanium (Ti); and, the thermal conductivity of these materials are lower than the thermal conductivity of silicon crystals. For the thermal of conductivity 0.4 W/mm K (=4 W/cm K) sufficient to cool an FPA by two Kelvin, as given in Table 1, silicon crystals surpass the desired thermal conductivity for the entire IR detector operating temperature range 493. Thus silicon crystals are well suited thermally as the material for the flexing structure 431.

Figure 5A:
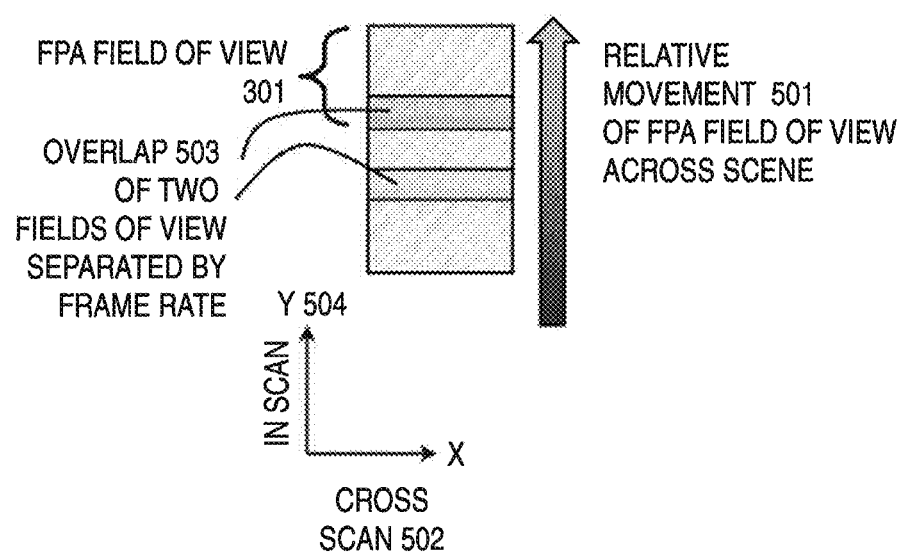
FIG. 5A is a block diagram that illustrates example scanning of a ground scene with the system of FIG. 1, according to an embodiment.

FIG. 5A is a block diagram that illustrates example scanning of a ground scene with the system of FIG. 1, according to an embodiment. In this embodiment, the ground scene is continuously scanned with a staring array FPA. The FPA field of view 301 is depicted for three successive frames with a relative movement 501 of the FPA field of view across the scene. During collection of each frame over the integration time interval, the movement of the scene at the focal plane is compensated by movement of the FPA on the flexing structure by the drive actuator. The y direction of pixels along the scanning direction is indicated by the in scan arrow 504. The x direction of a bank of pixels perpendicular to the scanning direction is indicated by cross scan arrow 502.

Figure 5B:
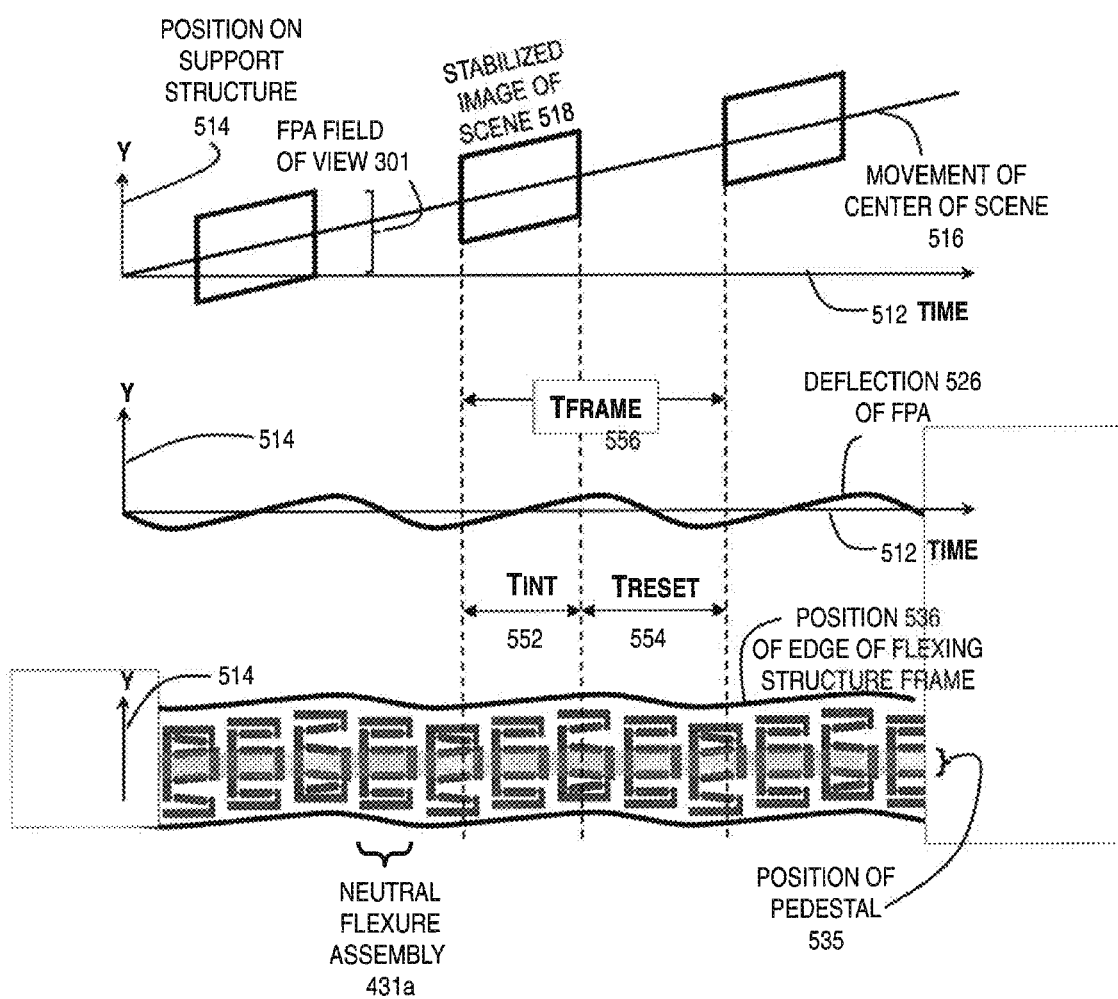
FIG. 5B is a block diagram that illustrates example movement of an image and a flexing structure for use with an FPA, according to an embodiment.

FIG. 5B is a block diagram that illustrates example movement of an image and a flexing structure for use with an FPA, according to an embodiment. In an upper panel, a horizontal axis 512 indicates time; and, a vertical axis 514 indicates position on the focal plane relative to the support structure (e.g., in the Dewar). The trace 516 indicates movement of the center of the scene across the support structure (which corresponds to position on the motherboard in the illustrated embodiment). The position of a stabilized image (frame) of the scene, which stays centered on the scene during an integration time interval, is given by parallelogram 518.

The vertical extent of the parallelogram 518 represents the number of banks of pixels in the scanning direction. The width of the parallelogram 516 is the integration time interval Tint 552 indicated along the time axis 512. The next stabilized image (frame) is taken at a later time that starts a Tframe time 556 after the start of the previous frame. The difference between the larger Tframe and the smaller Tint is the reset time Treset 554. As is apparent, to capture the stabilized image of the scene, the FPA should move during the integration time interval Tint 552 by the amount that trace 516 changes in the y direction during the integration time interval Tint 552; and, the FPA should reset for the next image by the end of the rest time Trest 554.

In the middle panel, the time axis 512 and position axis 514 are the same. Here trace 526 indicates the position of the FPA in the focal plane relative to the support structure (e.g., the motherboard in the illustrate embodiment). During collection of each stabilized image (e.g., during Tint 552), the FPA is being moved linearly in the y direction is the same direction as the scanning. At the end of each integration time, the FPA is caused to slow down, stop, reverse movement to a minimum y position, stop, and reverse again, all during each Treset 554.

In the lower panel, the time axis 512 and position axis 514 are the same. Here the flex of a flexure assembly (e.g., prismatic flexure-quad assembly 430 or 431) in the flexing structure is diagrammed. Trace 536 indicates movement of the edge of a frame (e.g., frame 450 or 451) and is in synchrony with the desired movement of the FPA. At the same time, the position of the pedestal 535 remains constant throughout the trace. Midway through each advance during the integration time interval and each retreat during the reset time interval, the flexure assembly reaches a neutral configuration (e.g., 431a of FIG. 4B). In other embodiments, the flexures are laid out so that they are at one end of their range of motion when neutral, so that they were always pushed and not push-pulled. Such embodiments may be advantageous to improve linearity of loading on the drive actuator.

Thus, in FIG. 5B, the lower panel shows the motion of one of the prismatic assemblies in motion over time where the stage motion in the linear region is in sync with the optical image flow. In one embodiment, similar to what is currently done for step-stare or back-scan mirror control, control electronics external to the motherboard apply a voltage waveform to the piezo actuator 460 using output from the capacitance position sensor 440 and an external Inertial Motion Unit (IMU) as feedback to synchronize the FPA mechanical motion with the scene image movement. In one embodiment, capacitance sensing circuitry is embedded in the readout IC 385 and transmitted to the sensor electronics via a serial communication link.

During the integration time the FPA field of view 301 is stabilized on the scene. As soon as the signal integration or snapshot is complete and the flexure has retraced and is back in linear image movement, another sample of the ground can be taken. If the frame time of the FPA exceeds the sum of the integration time and reset time, then there is opportunity for improved sensor performance by using a faster readout integrated circuit.

Depending on the scene revisit rate, it may be possible to take multiple samples for each location on the ground, though several different physical pixels could be associated with each ground pixel. It is noted that in the illustrated example in FIG. 5A, two overlap portions 503 of the scene are depicted. In each overlap portion, two different portions of corresponding two FPA fields of view from the same FPA observe the same portion of the scene. An upper portion of the first field of view of the FPA covers the same portion of the scene as a lower portion of the subsequent field of view of the same FPA in the next frame. This means two different pixels of the FPA view the same part of the scene. This circumstance is used in some embodiments to obtain sub pixel resolution or multispectral images in the overlap portions 503, as explained in more detail below.

The FPA velocity is advantageously closely matched with the optical image flow, with the control loop for the piezo actuator 460 preferably keeping the pixel iFOV 301 stable to within 0.1 pixel to avoid image quality degradation. As soon as the data is read out, and the flexure has retreated, the sensor is ready for the next integration. The image from each stabilized snapshot can then be processed and stitched together to form a contiguous large image. An example such approach for stitching together snapshots is described in "Extended Range Image Processing for Electro-Optical Systems," U.S. Pat. No. 7,760,965 issued Jul. 20, 2010, the entire contents of which are hereby incorporated by reference as if fully set forth herein, except for terminology inconsistent with that used herein.

In some embodiments, multiple small FPA are used instead of one large FPA. Very large area FPAs become exponentially more expensive due to low yield resulting from likelihood of defects landing on the active areas and high processing and materials cost as there are relatively few readout and detector die per processed wafer. Approaches to reduce cost and SWaP have been developed.

Figure 6A:
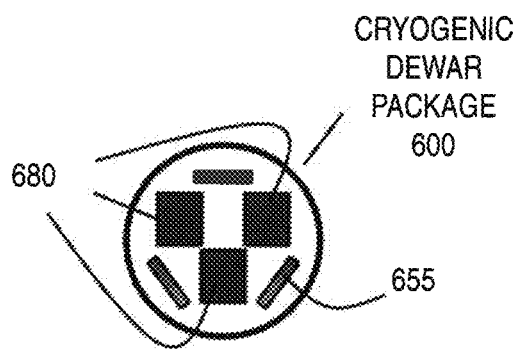
FIG. 6A and FIG. 6B and FIG. 6C are block diagrams that illustrate combined use of multiple scanning staring FPAs, according to an embodiment.
Figure 6B:
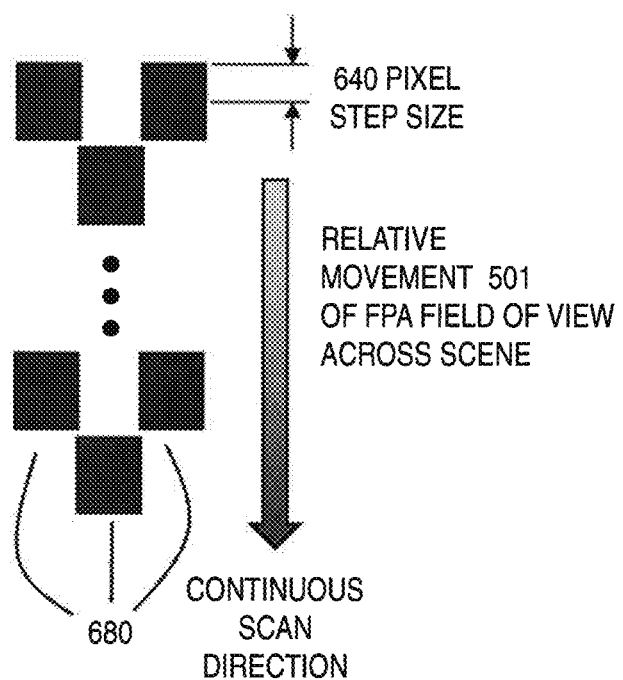
Figure 6C:
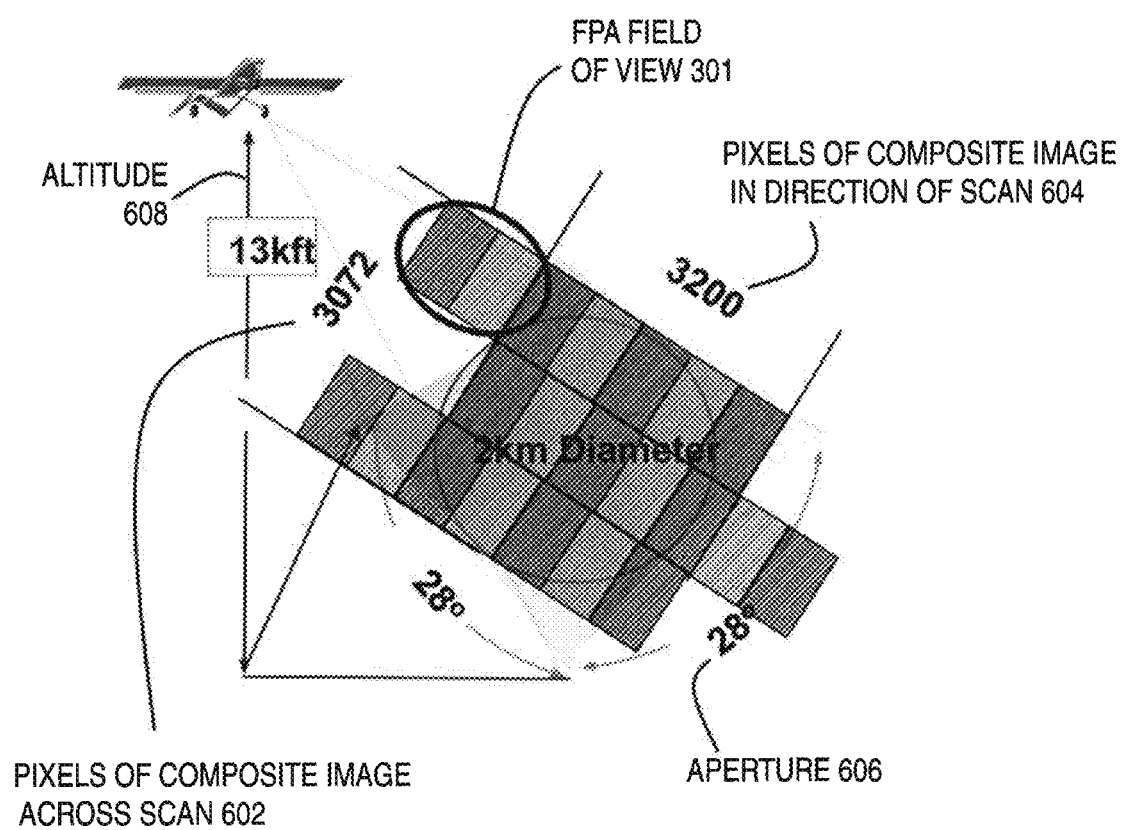

FIG. 6A and FIG. 6B and FIG. 6C are block diagrams that illustrate combined use of multiple scanning staring FPAs, according to an embodiment. These FPAs can be much smaller and less expensive to produce and operate, yet provide in congregate, the same wide area imaging of a single much larger FPA. In FIG. 6A, the illustrated example embodiment includes three FPAs 680, each moveable on a flexing structure with drive actuator, combined in a single cryogenic Dewar package 600. Bars 655 represent connectors for getting a signal out of the Dewar, shown to indicate sufficient space for a practical implementation. For purposes of illustration, it is assumed that the FPA are IR sensors, each with a staring array of 1280 pixels in scan and 1024 pixels cross scan. FIG. 6B depicts the ground scenes collected at two different times separated by many frames. The direction of movement 501 of the FPA field of view across the scene is depicted. For a short enough Tframe, the field of view of each FPA has moved less than the size of the field of view.

For example, the field of view only advances 640 pixels of the 1280 pixels of each FPA in the scanning direction. In this arrangement, each scene pixel is sampled twice (by two pixels on different parts of the FPA). FIG. 6C shows how a series of such frames can be stitched together to form a large digital image with two pixel samples at each ground location. As an aircraft at 13,000 feet (13 kilofeet, kft, 1 kft=$10^3$ feet) which is about 4 kilometers (km, 1 km=$10^3$ meters) samples a field of view of 28 degrees from the three combined FPA, a 2 km by 2 km scene is captured, twice, with a composite image of 3200 pixels in scan 604 and 3072 pixels cross scan 602, for a 10 Megapixel composite image.

The characteristic of the example composite image are summarized in Table 4 for FPA with pixel spacing of 12 microns.

TABLE 4

Characteristics of Composite Image from Package with Three Medium-Sized FPA.

| | | | |
|---|---|---|---|
| FPA | Pitch | 12 | μm |
| SBF207 | Sample Regions | 1 | |
| | InScanPix | 1280 | p |
| | CrossScanPix | 1024 | p |
| | Frame Rate | 120 | Hz |
| | Integration Time | 2.1 | ms |
| | Effective wavelength | 4.8 | um |
| | FPA Power | 125 | mW |
| | NEΔT (f/2, 300 K, 4 ms) | 25 | mK |
| Scene | Num of FPAs | 3 | |
| 3 FPA × 3 IDCA | Num of IDCAs | 1 | |
| | Vertical Offset | 1280 | p |
| | Swath Width | 3072 | p |
| | Scan Length | 3200 | p |
| | Scene Rate | 10.2 | Hz |
| | Encircled Diameter | 2.0 | km |
| | Altitude | 4 | km |
| | f/# | 2 | |
| | Retrace Time | 40 | ms |
| Outputs | PixSteps | 640 | p |
| | Samples per Region | 2 | per pixel |
| | Steps | 7 | per scene |
| | Eff Array Size | 10 | MegaPix |
| | GSD | 0.65 | m |
| | IDCA FOV | 28 | degree |
| | Focal Length | 7 | cm |
| | Aperture | 1.5 | inch |
| | Scene Integration | 4 | ms |
| | Backscan Pixels | 160 | p |
| | Backscan Distance | 1.92 | mm |
| | Scan Velocity | 922 | mm/s |
| Metrics | FPA NEΔT | 24 | mK |
| | Q | 0.8 | λf/p |
| | ELR | 33 | kHz |
| | PixRate | 0.20 | GPPS |
| | EffPwr | 1.88 | mW/MPPS |

Thus, with an example medium-area imaging system, a 10 Megapixel sensor is provided utilizing three 1.3 Megapixel focal plane arrays 680 in a single package 605. For the example analyzed in Table 4, the three 1280×1024 12 μm pitch FPAs 680 are positioned in a staggered arrangement in the package 680 so that when the field of view 301 of each FPA is stepped in a linear direction, the FPA images overlap, providing for a continuous 10 Megapixel video in step 221, after image processing has stitched the snapshots back together. In this example embodiment, each of the three FPA's 680 are mounted on a flexing structure, such as flexing structure 400 or 402. In some embodiments, all three FPA are mounted to the same motherboard that is mounted on a flexing structure and the motherboard is moved instead. If willing to operate at commensurably slower scan rates, moving the motherboard with three FPA is advantageous as a good compromise for manufacturing and component simplicity. This staggered FPA arrangement provides space for wire bonding and bypass capacitors. By using several smaller FPAs in the cross scan, and stepping them in the in-scan direction, this staggered approach simplifies the focal plane array assembly manufacturing, without sacrificing resolution in the cross scan dimension.

For simplicity, the analysis in Table 4 ignores overlap pixels. As listed in Table 4 for the composite image, the field of view 301 is stepped seven times, each step comprising 640 pixels. The first two steps account for the vertical offset of one FPA (which is 1280 pixels). The next five steps produce a 5×640=3200 in scan pixels on the ground. The three FPAs produce 3×1024=3072 cross scan pixels on the ground. At a readout IC frame rate of 120 Hz, the frame time is 1/120 Hz=8.4 ms. The seven steps require 7×8.4 ms=60 ms and combined with a 40 ms scan retrace time, the total scene revisit time is 100 ms. This is equivalent to a scene refresh rate of 10 Hz. Each ground pixel is sampled twice because the FPA is stepped 640 pixels but it is 1280 pixels long. Assuming one quarter of the frame time is applied to integration, once the two samples are registered and co-added, the total integration time is 4.2 ms which produces a sensitivity of 24 milliKelvin (mK, 1 mK=$10^{-3}$ Kelvin) at the FPA for a 300 K scene using an f/2 optical system, not taking into account losses associated with the system optics.

At each frame, the image travels 640 pixels. To compensate for the continuous motion, the flexure assembly used is designed to travel 160 pixels (equivalent to ±0.96 mm) with a peak velocity of 1.92 mm/2.08 ms=922 mm/s. The flexure assembly is tracking the optical image flow for 2.1 ms and has 6.3 ms to recover for each cycle. If a shorter integration time is used, the speed of flexure travel can be reduced commensurately. In this example, a 10 Megapixel image is taken at a 10 Hz refresh rate with two samples per ground pixel. Thus the number of ground samples per FPA pixel is 2*10/(3×1.3)=5 samples per pixel. In addition, with multiple samples per ground pixel, each taken from different regions of the FPA, lower operability focal plane arrays can be used. The reduced sensitivity to pixel-level cluster defects as compared with imaging systems using staring arrays can dramatically improve FPA yield, resulting in lower cost per image. Through these advantages, a continuously scanned staring FPA imaging system cost is dramatically reduced without introducing complicated fast back-scan or step-stare optical components.

Due to the fast recovery time of the various flexing structures 310, 400, 402, multiple samples per ground pixel can be taken while maintaining high revisit rates, resulting in higher integrated signal and sensitivity.

Alternatively, different portions of the FPA can serve different functions. In some embodiments the different portions of the FPA provide dithering for sub-pixel resolution, or are filtered differently for multispectral or polarized images, or some combination.

Figure 7A:
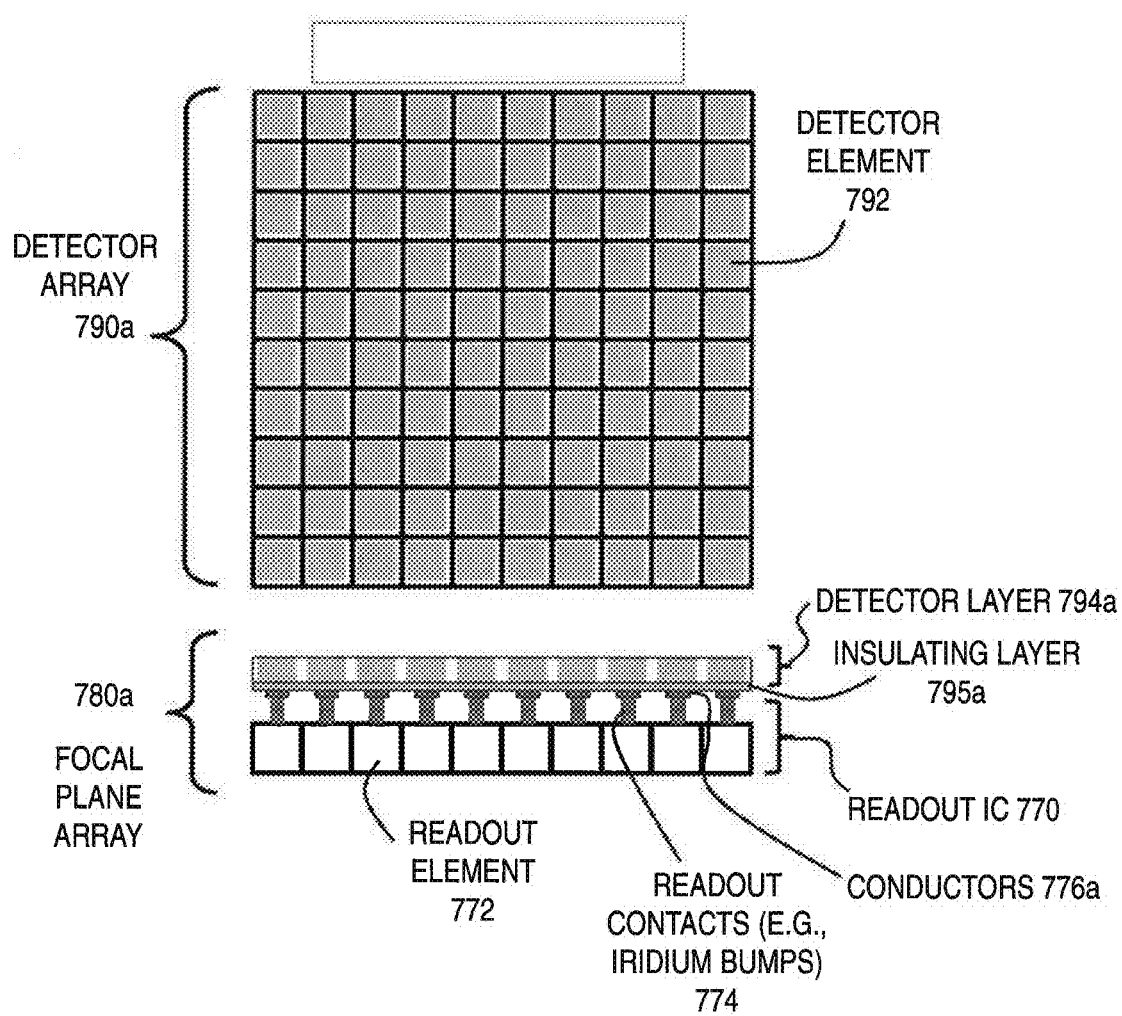
FIG. 7A is a block diagram that illustrates an example uniform FPA, according to an embodiment.

FIG. 7A is a block diagram that illustrates an example uniform FPA, according to an embodiment. The FPA 780a, includes a detector layer 794a, comprising a detector array 790a of uniformly sized and spaced detector elements 792 that constitute the FPA pixels. The FPA 780a also includes a readout integrated circuit (readout IC) 770 made up of an array of readout elements 772. Centered on each readout element 772 is a readout contact (e.g., an Indium bump). An insulating layer 795a separates the readout IC 770 from the detector layer 794a. Conductors 776a electrically connect the readout contacts 774 one-to-one to a contact on a corresponding nearest detector element 792 through the insulating layer 794a.

Figure 7B:
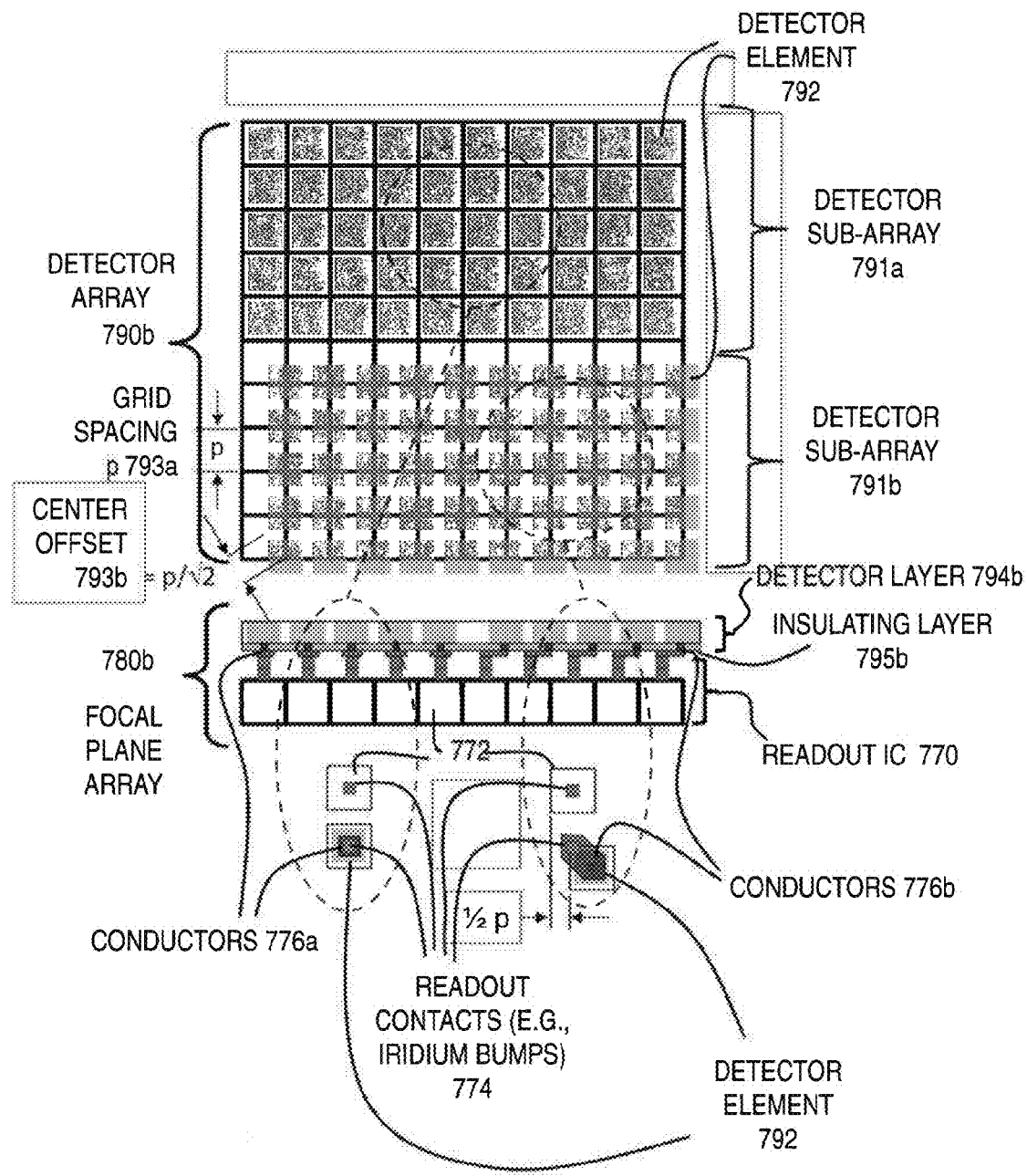
FIG. 7B is a block diagram that illustrates an example FPA with dithered detectors for sub-pixel resolution while scanning, according to an embodiment.

FIG. 7B is a block diagram that illustrates an example FPA with dithered detectors for sub-pixel resolution while scanning, according to an embodiment. In this embodiment, the readout IC 770, readout elements 772 and readout contacts 774 are the same as in FIG. 7A, but the conductors 776b, insulating layer 795b and detector layer 794b are different. The detector layer 794b comprises a different detector array 790b comprising a first detector sub-array 791a and a second detector sub-array 791b. Both sub-arrays arrange detector elements 792 on a regular grid with grid spacing p 793a; but, the grid of detector sub-array 791b is offset in one or two horizontal directions by an amount less than the grid spacing p 791a and typically more than about one eighth of the constant spacing, e.g., by a center offset 793b of p $(2)^{-1/2}$ for equal offsets in both horizontal directions of half the grid spacing p. To accommodate this offset, the conductors 776b are changed to have different configurations and pass through the insulating layer 795b at different locations than in sub-array 791a or in FIG. 7A. The difference in conductors 776a and 776b are depicted in FIG. 7B. Thus, the conductors are configured to electrically connect one-to-one the plurality of readout contacts through the insulating layer to the corresponding plurality of detector elements by traversing any offset between a particular readout element and a corresponding particular detector element.

In the illustrated embodiment, the two sampling regions are offset ½ pixel spacing p 793a in both the x and y directions, performing a non-mechanical dithered ground sampling and increasing the resolutions. It is possible to design a readout with shifted pixels and a matching detector array, but this is a specific implementation that limits the use of the readout to only one application and the shift in interconnect patterns can result in manufacturing difficulties such as the wicking of underfill epoxy. Thus it is advantageous to use a standard readout IC and take up the dithering only in the detector layer, insulating layer or conductors, or some combination. This offset interconnect can be done on either side. It is standard in the art that during post readout fabrication at a foundry, a contact and indium bump are deposited. In an alternate embodiment, a dielectric glass layer is included; and interconnects are made to indium bump shifted on the readout side instead of on the detector side, still with the detector banks offset. As stated above, it is advantageous to have the bumps on the regular readout grid, which helps with a standard method of wicking an underfill epoxy and works better if the bump "forest" is on a regular grid. But fabricating the "offset" on either side is viable as well in other embodiments. In some embodiments, the indium (or alternate) interconnect is only deposited on one side and the readout and detector array are joined or hybridized by methods well known to those skilled in the art.

Referring to the example embodiment in FIG. 7A, a standard focal plane array 780a is comprised of a readout integrated circuit 770 interconnected to a uniform detector array 790a. The interconnection can be achieved by many methods and structures, for example using Indium bumps and a hybridization process well known to those skilled in the art.

The non-mechanically dithered focal plane array 780b includes a readout IC 770 with a uniform unit cell 772 array and monolithic detector array 790b including two or more sub-arrays 791a and 791b. The two sub-arrays are designed and patterned offset from each other during the detector fabrication process of the detector die. For the illustrated array 790b, at least one detector sub-array is offset from the readout interconnect. The offset detector element 792 is wired to the indium interconnect using the under-bump metal conductors 776a and 776b (collectively called conductors 776). As is standard in the art, to avoid undesired electrical connection between interconnects or detector pixels, insulating dielectric layers are disposed on top of, and underneath, the interconnect metal conductors 776 with vias (ways through) etched to provide connection to the intended detector pixel and interconnect. Many variants of this approach can be implemented in various embodiments. For example, in the illustrated detector array 790b the sub-arrays 791a, 791b are offset from the readout elements 772 using a (0,0), (+½, +½) pattern. In an advantageous variation, which minimizes the length of the physical offset and underbump metal 776, a (−¼, −¼), (+¼, +¼) pattern is used. By this approach the resolution has been improved to sub-pixel spacing of √p=8.5 μm.

It is also possible to hybridize two separate detector die to such an offset pattern readout, though this is less preferred as it adds manufacturing complexity and a gap between the die.

Figure 7C:
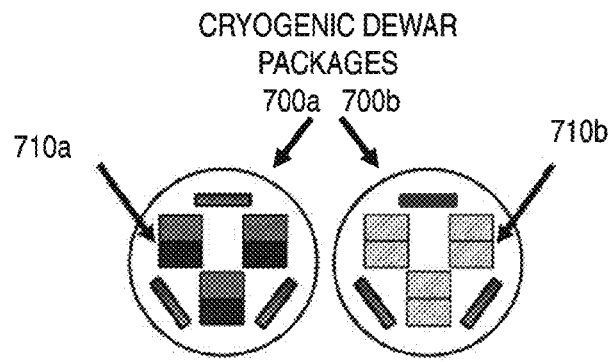
FIG. 7C and FIG. 7D are block diagrams that illustrate combined use of multiple scanning staring dithered FPAs, according to an embodiment.
Figure 7D:
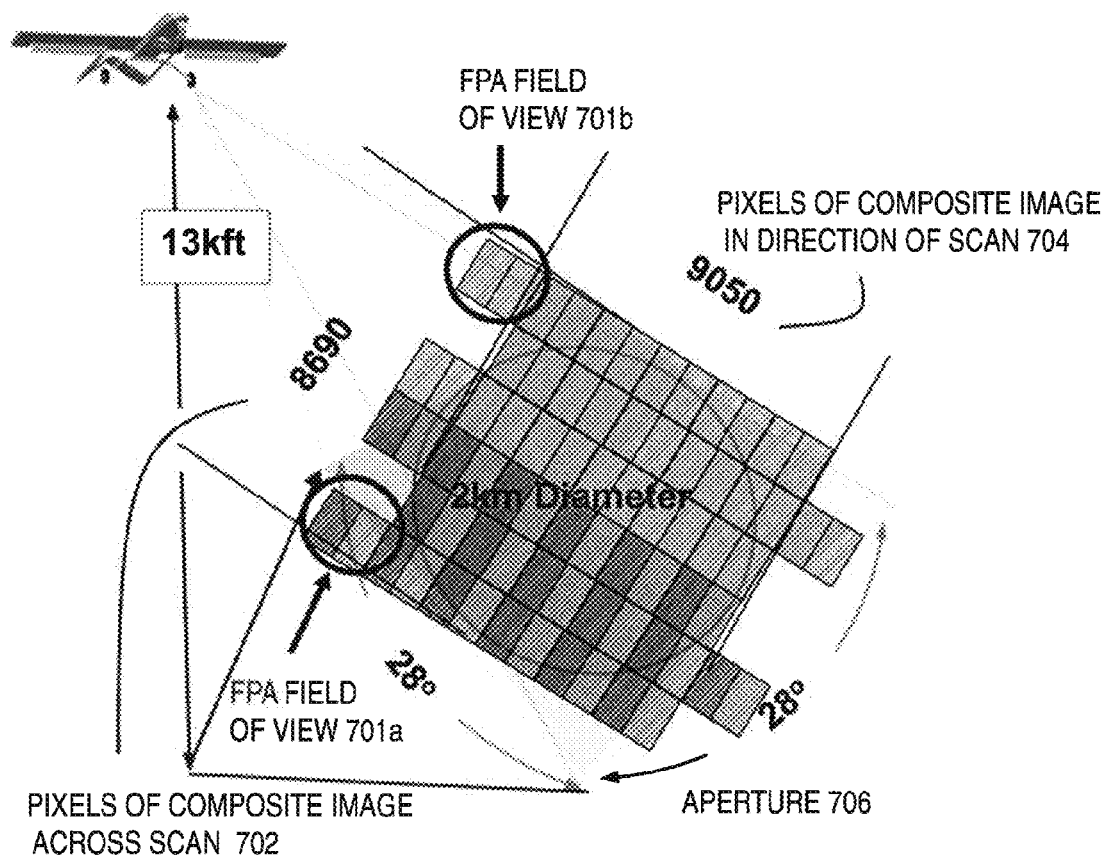

FIG. 7C and FIG. 7D are block diagrams that illustrate combined use of multiple scanning staring dithered FPAs, according to an embodiment. FIG. 7C shows an example wide-area imaging system providing a 75 Megapixel image utilizing six 1.3 Megapixel focal plane arrays with the non-mechanically dithered FPAs 710a and 710b, such as FPA 780b shown in FIG. 7B. By using two Integrated Dewar Cooler Assemblies 700a, 700b, each with three focal plane arrays 710a, 710b, respectively, using the same readout IC 770, the overall Dewar package size, associated optics and manufacturing complexity are reduced, providing a lower-cost imaging system. In addition, as depicted in FIG. 7D, the field of view for the optics in this configuration is reduced from 28 degrees to 14 degrees by using two packages, simplifying the optics design and manufacturing requirements. The flexure assembly velocity and travel requirements are the same as for the 10 Megapixels imaging system of FIG. 6A through FIG. 6C. However, with more pixels, e.g., 9050 in scan pixels 704 and 8690 cross scan pixels 702, the ground sample distance (GSD) has been reduced to 0.23 m. To support the smaller GSD and sampling distance with the same f-stop number, the aperture 706 is increased to 3 inches. The NEΔT IS 35 mK for two dithered regions, or 25 mK for sampling the same scene with two non-dithered pixels.

The characteristic of the example composite image are summarized in Table 5.

TABLE 5

Characteristics of Composite Image from Two Packages, Each with Three Medium-Sized FPA with Two Dithered Pixel Sets.

| | | | |
|---|---|---|---|
| FPA | Pitch | 12 | μm |
| SBF207 | Sample Regions | 2 | |
| | InScanPix | 1280 | p |
| | CrossScanPix | 1024 | p |
| | Frame Rate | 120 | Hz |
| | Integration Time | 2.1 | ms |
| | Effective wavelength | 4.8 | um |
| | FPA Power | 125 | mW |
| | NEDT (f/2, 300 K, 4 ms) | 25 | mK |
| Scene | Num of FPAs | 6 | |
| 3 FPA × 3 IDCA | Num of IDCAs | 2 | |
| | Vertical Offset | 1280 | p |
| | Swath Width | 6144 | p |
| | Scan Length | 6400 | p |
| | Scene Rate | 7.1 | Hz |
| | Encircled Diameter | 2.0 | km |
| | Altitude | 4 | km |
| | f/# | 2 | |
| | Retrace Time | 40 | ms |

TABLE 5-continued

Characteristics of Composite Image from Two Packages, Each with Three Medium-Sized FPA with Two Dithered Pixel Sets.

| | | | |
|---|---|---|---|
| Outputs | PixSteps | 640 | p |
| | Samples per Region | 1 | per pixel |
| | Steps | 12 | per scene |
| | Eff Array Size | 79 | MegaPix |
| | GSD | 0.23 | m |
| | IDCA FOV | 14 | degree |
| | Focal Length | 15 | cm |
| | Aperture | 2.9 | inch |
| | Scene Integration | 2 | ms |
| | Backscan Pixels | 160 | p |
| | Backscan Distance | 1.92 | mm |
| | Scan Velocity | 922 | mm/s |
| Metrics | FPA NEDT | 35 | mK |
| | Q | 1.1 | λf/p |
| | ELR | 46 | kHz |
| | PixRate | 0.56 | GPPS |
| | EffPwr | 1.34 | mW/MPPS |

Figure 8A:
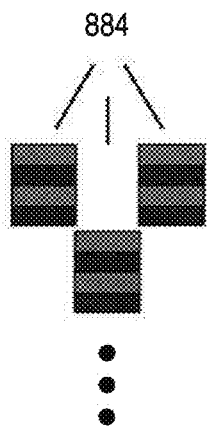
FIG. 8A and FIG. 8B are block diagrams that illustrate an example combined use of multiple scanning staring FPAs with dithering, according to an embodiment.
Figure 8B:
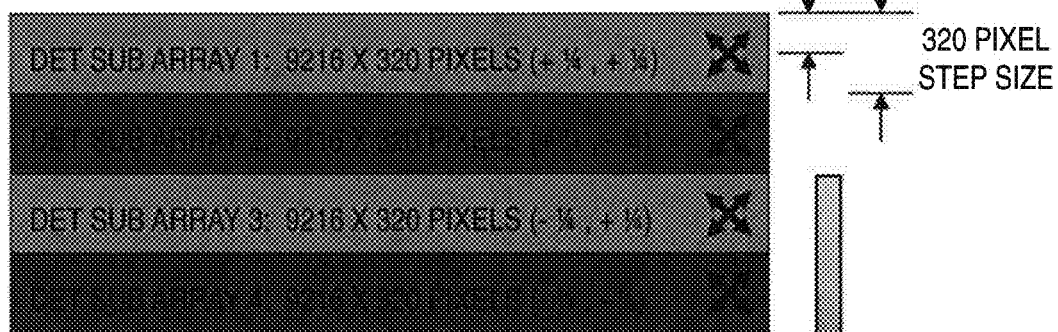

FIG. 8A and FIG. 8B are block diagrams that illustrate an example combined use of multiple scanning staring FPAs with dithering, according to an embodiment. Here three FPAs 884 are used, each with four different, non-mechanically dithered regions. FIG. 8B shows relative movement 501 of FPA field of view, a sub array size of 320 pixels and a step size of 160 pixels between frames. This provides a 4 fold increase in effective array size and 2 fold improvement of the ground sample distance. In this example, the frame rate is 120 Hz (8.3 ms frame time); integration time is 4.2 ms (50%); retrace time is 4.2 ms (50%). This provides precise "backscan" with flexure assembly for only Tint=4.2 ms (or 160 rows) of main-scanner travel. By next frame (4.2 ms later) main scanner mirror has traveled an additional 160 pixels while the FPA position has reset for another integration. Each snapshot has 1280 rows with 4 sub-arrays sampling+¼ pixel in scan and +¼ pixels cross scan dithers. 6400 in scan length=20 steps of 320 pixels, 1 integration per pixel per region or 4 snapshots per FPA Field of View.

Figure 8C:
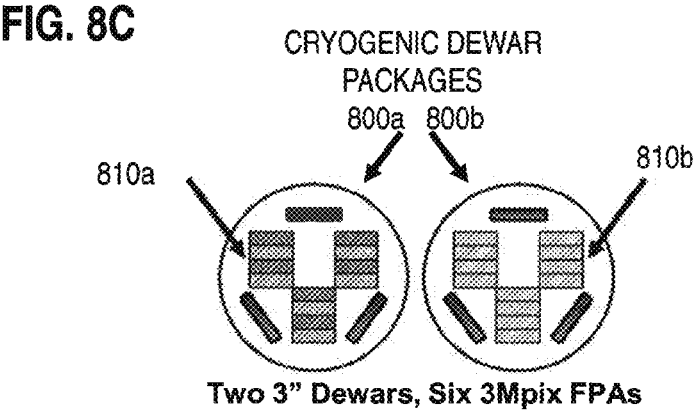
FIG. 8C and FIG. 8D are block diagrams that illustrate combined use of multiple scanning staring dithered FPAs, according to an embodiment.
Figure 8D:
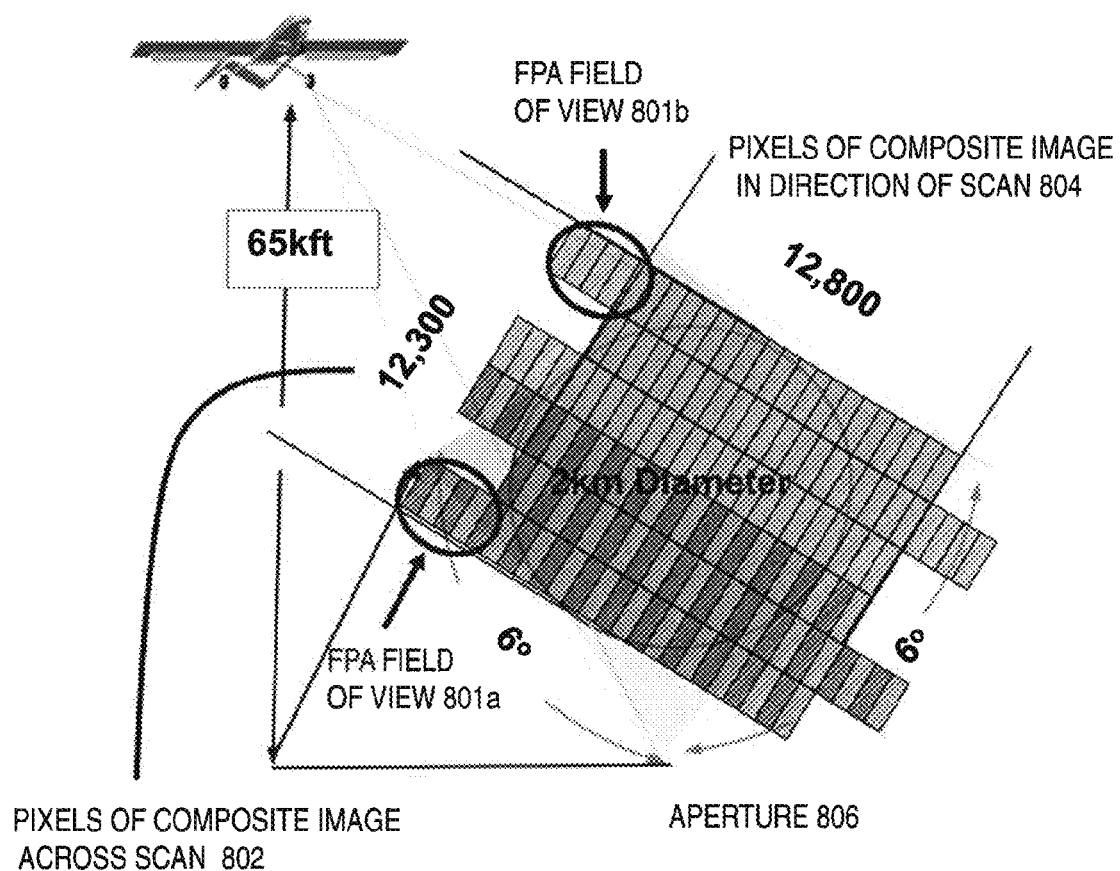

FIG. 8C and FIG. 8D are block diagrams that illustrate combined use of multiple scanning staring dithered FPAs, according to an embodiment. FIG. 8C shows an example wide-area imaging system providing a 150 Megapixel image utilizing six 1.3 Megapixel focal plane arrays with the four region non-mechanically dithered FPAs 810a and 810b, such as FPA 884. By using two Integrated Dewar Cooler Assemblies 800a, 800b, each with three focal plane arrays 810a, 810b using the same readout IC 770, the overall Dewar package size, associated optics and manufacturing complexity are reduced, providing a lower-cost imaging system. Given the 6 FPA are arranged in a staggered offset there is about one FPA or 4 additional steps required (20+4)*(8.4 mS)=200 ms, followed by 40 ms retrace. Scene revisit rate=1/0.240 s=4.2 Hz and produces a ground sampling of 12,800 (in scan)×12,300 (cross scan) image at 6 micron×6 micron sampling. (157 Megapixels). Average data rate is 157 Megapixels*4.2 Hz=660 Megapixel/s; peak data rate is 120 Hz*1.3 Megapixel*6 FPA=936 Megapixels/s. Effective Line Rate is 6,4000 in scan pixels*4.2 Hz=27 kHz for each sub array. Here the ground-pixel to physical-pixel ratio is 157/(6*1.3)=20, a dramatic reduction in FPA area and cost.

The characteristic of the example composite image are summarized in Table 6.

TABLE 6

Characteristics of Composite Image from Two Packages, Each with Three Medium Sized FPA with Four Dithered Pixel Sets.

| | | | |
|---|---|---|---|
| FPA | Pitch | 12 | μm |
| SBF207 | Sample Regions | 4 | |
| | InScanPix | 1280 | p |
| | CrossScanPix | 1024 | p |
| | Frame Rate | 120 | Hz |
| | Integration Time | 2.1 | ms |
| | Effective wavelength | 4.8 | um |
| | FPA Power | 125 | mW |
| | NEDT (f/2, 300 K, 4 ms) | 25 | mK |
| Scene | Num of FPAs | 6 | |
| 3 FPA × 3 IDCA | Num of IDCAs | 2 | |
| | Vertical Offset | 1280 | p |
| | Swath Width | 6144 | p |
| | Scan Length | 6400 | p |
| | Scene Rate | 4.2 | Hz |
| | Encircled Diameter | 2.0 | km |
| | Altitude | 20 | km |
| | f/# | 2.0 | |
| | Retrace Time | 40 | ms |
| Outputs | PixSteps | 320 | p |
| | Samples per Region | 1 | per pixel |
| | Steps | 24 | per scene |
| | Eff Array Size | 157 | MegaPix |
| | GSD | 0.16 | m |
| | IDCA FOV | 3 | degree |
| | Focal Length | 74 | cm |
| | Aperture | 14.5 | inch |
| | Scene Integration | 2 | ms |
| | Backscan Pixels | 80 | p |
| | Backscan Distance | 0.96 | mm |
| | Scan Velocity | 461 | mm/s |
| Metrics | FPA NEΔT | 35 | mK |
| | Q | 1.6 | λf/p |
| | ELR | 27 | kHz |
| | PixRate | 0.66 | GPPS |
| | EffPwr | 1.14 | mW/MPPS |

Figure 9A:
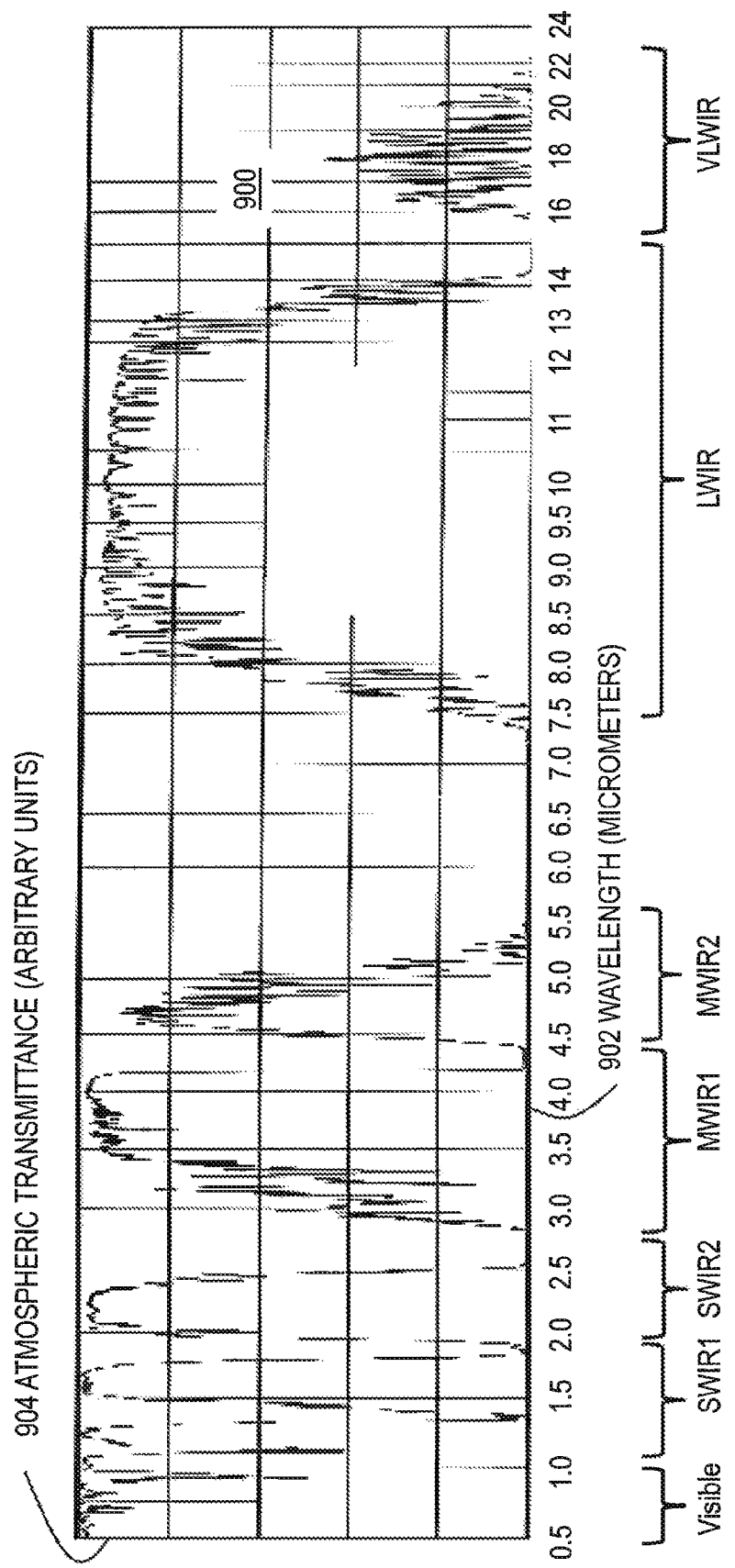
FIG. 9A is a graph that illustrates dramatic differences in atmospheric transmittance used to select example multiple spectral bands for scanning staring FPAs, according to an embodiment.

Having the ability to make multiple ground samples with each physical pixel and stitching the images back together real time enables other modes of operation such as multi-spectral imaging. FIG. 9A is a graph that illustrates dramatic differences in atmospheric transmittance used to select example multiple spectral bands for scanning staring FPAs, according to an embodiment. FIG. 9A includes graph 900, with horizontal axis 902 indicating wavelength in microns, and vertical axis 904 indicating atmospheric transmittance in arbitrary units from minimum to maximum. Different high transmittance bands are evident, such as centered on the visible, short wavelength infrared region 1 (SWIR1), short wavelength infrared region 2 (SWIR2), medium wavelength infrared region 1 (MWIR1), medium wavelength infrared region 2 (SWIR2), long wavelength infrared (LWIR), very long wavelength infrared (VLWIR).

Figure 9B:
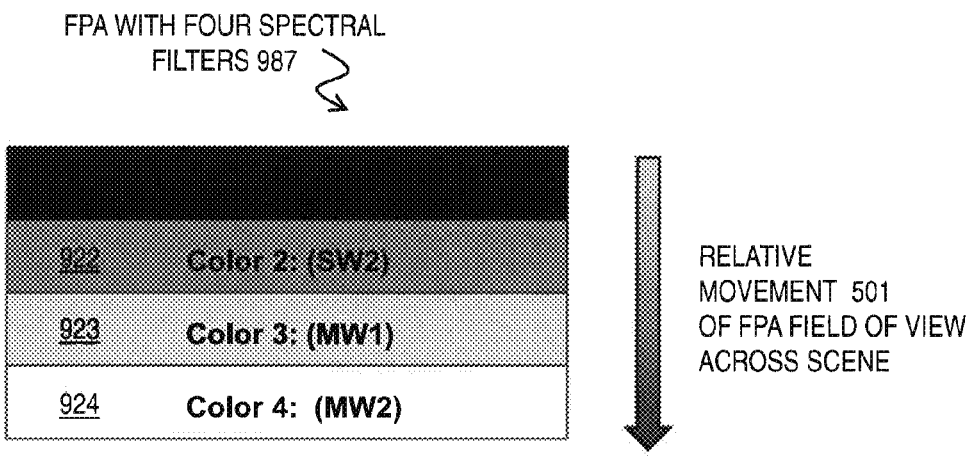
FIG. 9B and FIG. 9C are block diagrams that illustrate use of multiple example close proximity color filters for scanning staring FPAs, according to an embodiment.
Figure 9C:
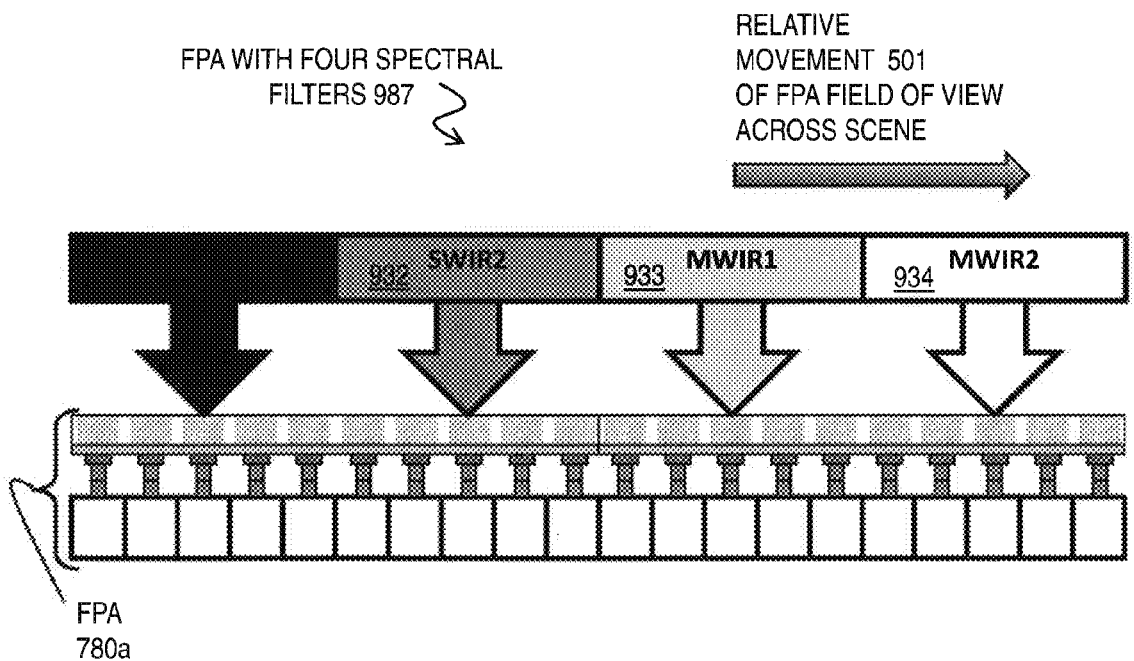

FIG. 9B and FIG. 9C are block diagrams that illustrate use of multiple example close proximity color filters for scanning staring FPAs, according to an embodiment. The four sampling regions are produced using close proximity filters directly attached to the focal plane array assembly (instead of dithering). These close proximity filters can be built with sizes comparable to the flexure translation range (e.g., S or 2 S). So other configurations, such as multiple repeating banks of detector sub-arrays are possible. A description of close proximity filters is disclosed by Scott and Pfister in "Method of Making a Close Proximity Filter and Multi-color MWIR Sensor and Resultant Device," in U.S. Pat. No. 8,014,062 issued Sep. 6, 2011, the entire contents of which are hereby incorporated by reference as if fully set for the herein, except for terminology inconsistent with that used herein. A FPA with four spectral filters 987 includes portion 921 for color 1 (e.g., SWIR1), portion 922 for color 2 (e.g., SWIR2), portion 923 for color 3 (e.g., MWIR1) and portion 924 for color 4 (MWIR2). These four filters pass different wavelength light to a uniform FPA, such as FPA 780a.

Figure 10A:
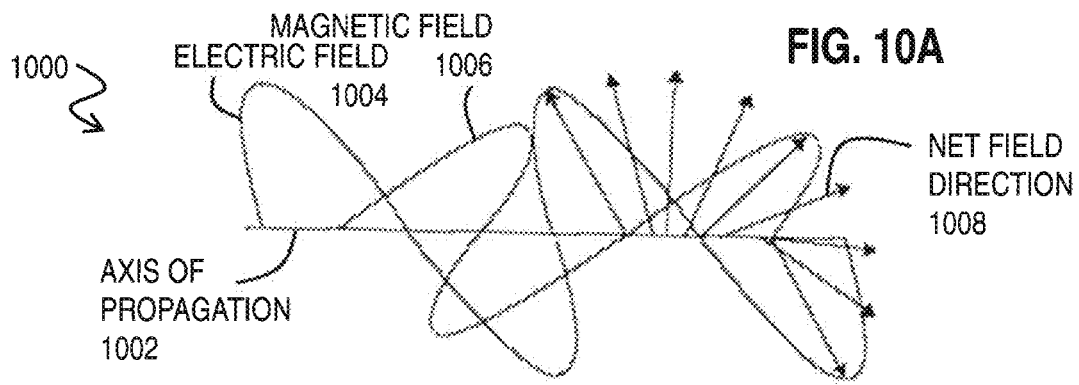
FIG. 10A and FIG. 10B are diagrams that illustrates optical polarization used to select example multiple polarization orientations for scanning staring FPAs, according to an embodiment.
Figure 10B:
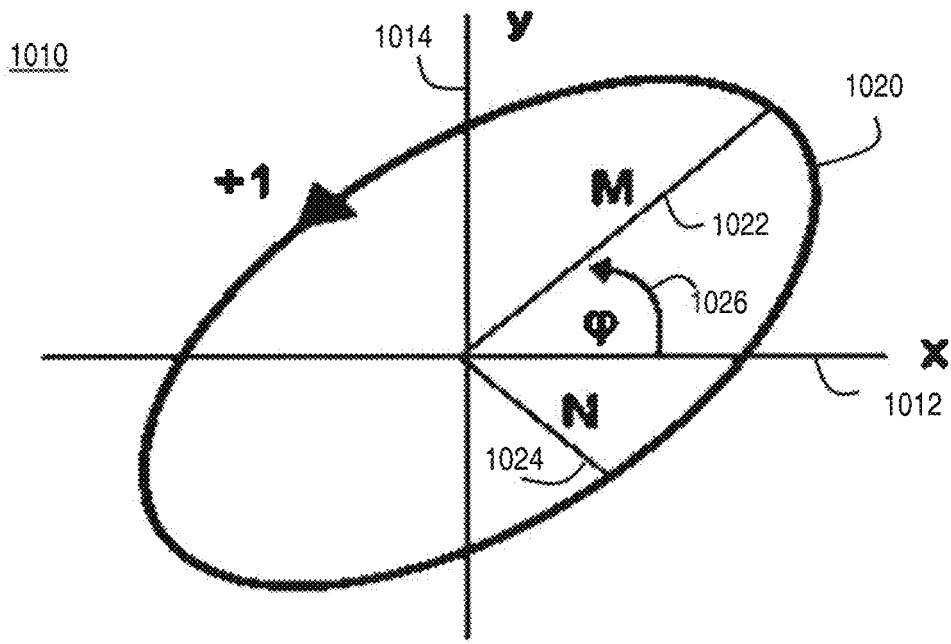

FIG. 10A and FIG. 10B are diagrams that illustrates optical polarization used to select example multiple polarization orientations for scanning staring FPAs, according to an embodiment. Electric field 1004 and magnetic field 1006 oscillate in directions perpendicular to each other and to an axis of propagation 1003. A net field direction is given by vector 1008. That vector is characterized by a polarization ellipse based on a major axis M and a minor axis N of lengths 1022 and 1024, respectively, and by an angle q from the major axis to the direction of horizontally polarized x.

FIG. 10C is a block diagrams that illustrates use of multiple example close proximity polarization filters for scanning staring FPAs, according to an embodiment. A FPA 1086 with four close proximity polarization filters includes portion 1051 for polarization mode 1 (e.g., 0 degrees), includes portion 1052 for polarization mode 2 (e.g., 45 degrees), portion 1053 for polarization mode 3 (e.g., 90 degrees), and portion 1054 for polarization mode 4 (e.g., 135 degrees). These four filters pass differently polarized light to a uniform FPA, such as FPA 780a.

Figure 11:
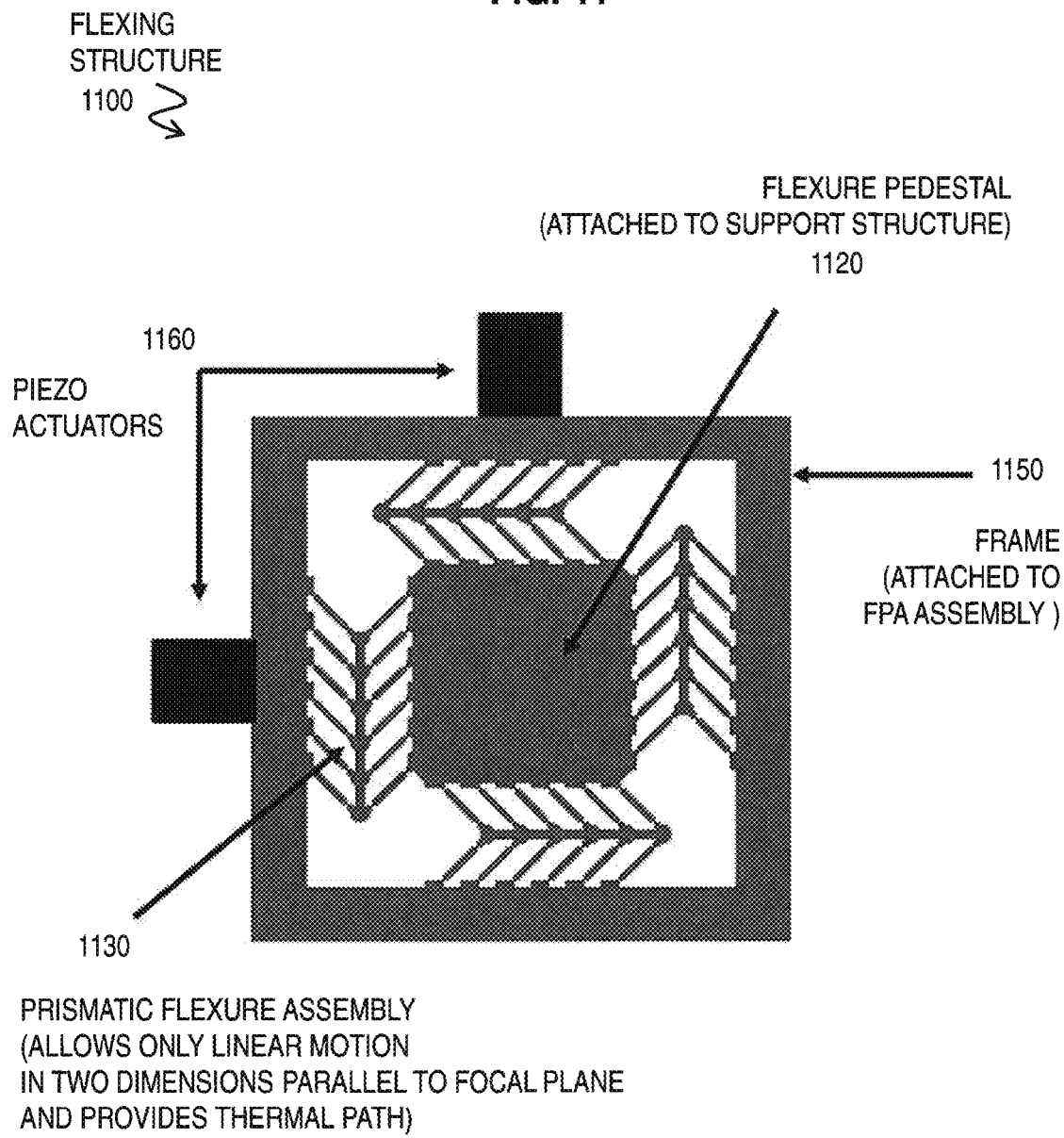
FIG. 11 is a block diagram that illustrates an example flexing structure for the system of FIG. 1, according to another embodiment.

FIG. 11 is a block diagram that illustrates an example flexing structure 1100 for the system of FIG. 1, according to another embodiment. FIG. 11 shows a two degree of freedom flexing structure 1100. It uses a pentagraph style of prismatic flexure 1130 which keeps the sides of the frame 1150 parallel to the sides of the pedestal 1120. The number of arms in each prismatic flexure 1130 is determined by the thermal conductance desired to maintain an acceptable temperature rise for the FPA, on the order of 1 degree Kelvin. As more arms are added, the stage becomes stiffer and requires more drive force from a piezoelectric actuator 1160 for each degree of freedom. The design can be optimized using the same analysis as for the linear flexure assembly described above. Not shown is a flexure linkage between the frame 1150 and the piezoelectric actuators 1160, which accommodates the lateral shift between the actuator and the frame from drive in the cross direction.

In addition to the designs presented above, other in-Dewar motion control can replace many optical functions. The fundamental advantages are that FPA movement is more cost effective than complex optical systems. The FPA is the smallest mass in the system and therefore can be moved at higher speeds with higher off-axis stiffness than optical or mechanical components with more mass and outside the Dewar. Many other applications are anticipated. Some examples include: two or three degrees of freedom (DOF) for Line of Sight/De-Roll stabilization; two DOF for x and y; three DOF for x, y and rotation, with only small amount of rotation q during integration; one or two DOF for dither-motion only; sub-pixel sampling for enhanced spatial resolution; multiple pixel dither regions to reduce cluster requirements for FPA cost reduction; fast dither between different sampling regions for multi-spectral, polarmetric targeting; out of plane (z axis) adjustment for moving FPA in image plane; simple focus or range estimation at close ranges; higher frequency electronic stabilization to reduce Gimbal costs; overlapping images of multiple different FPAs, e.g., for MWIR and LWIR or MWIR and SWIR; and, both fast stepping, scanning modes and non-overlapping staring modes.

Figure 12:
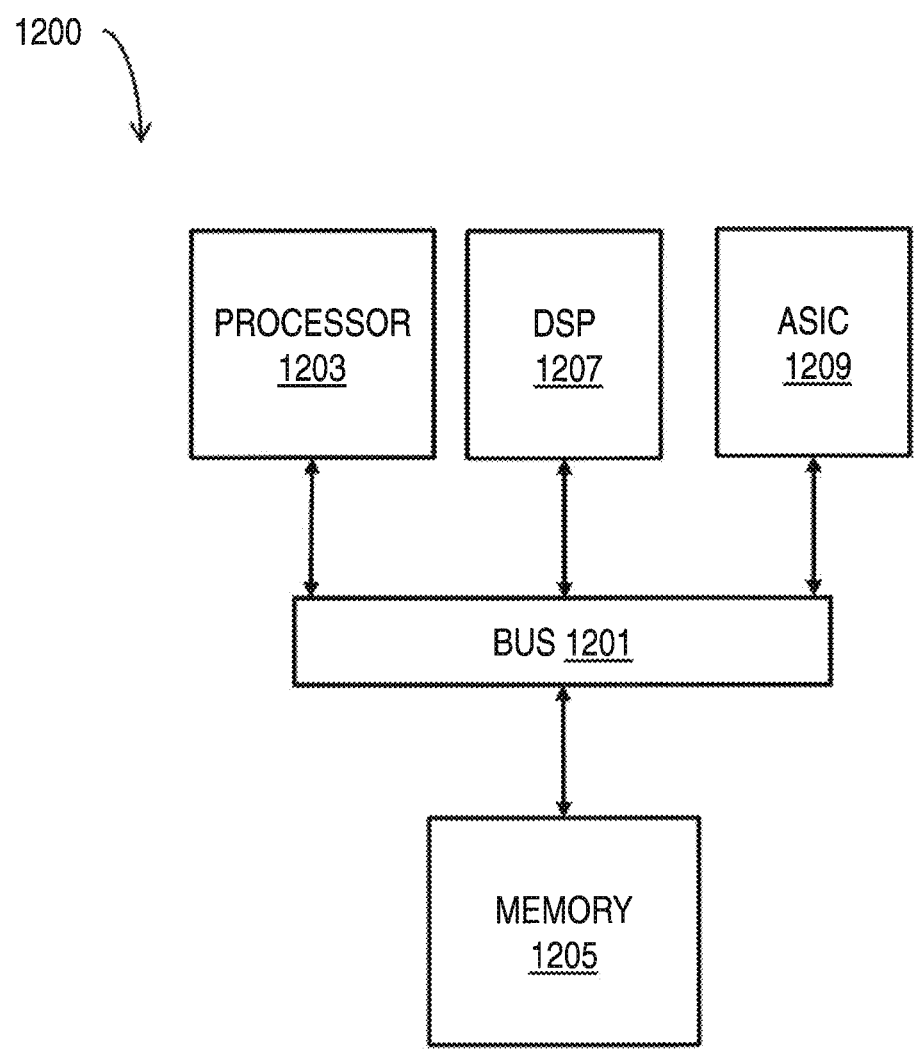
FIG. 12 illustrates a chip set upon which an embodiment may be implemented.

Processor Hardware Overview:

FIG. 12 illustrates a chip set 1200 upon which an embodiment may be implemented. Chip set 1200 is programmed to perform one or more steps of a method described herein and includes, for instance, processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of a method described herein.

Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system ~00, or a portion thereof, constitutes a means for performing one or more steps of one or more methods described herein. A sequence of binary digits constitutes digital data that is used to represent a number or code for a character.

A processor 1203 performs a set of operations on information. The set of operations include bringing information in from a bus 1201 and placing information on the bus 1201. The set of operations also typically include comparing two or more units of information, shifting positions of units of information, and combining two or more units of information, such as by addition or multiplication. A sequence of operations to be executed by the processor 1205 constitute computer instructions.

The memory 1205, such as a random access memory (RAM) or other dynamic storage device, stores information including computer instructions. Dynamic memory allows information stored therein to be changed by the computer system ~00. RAM allows a unit of information stored at a location called a memory address to be stored and retrieved independently of information at neighboring addresses. The memory 1205 is also used by the processor 1203 to store temporary values during execution of computer instructions.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1205 also stores the data associated with or generated by the execution of one or more steps of the methods described herein.

Extensions and Modifications:

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered. Moreover, unless specifically stated, any use of the terms first, second, etc., does not denote any order or importance, but rather the terms first, second, etc., are used to distinguish one element from another.

What is claimed is:

1. A system comprising:
   an assembly comprising one or more focal plane arrays, each comprising a plurality of pixels, wherein the one or more focal plane arrays captures an image of a scene;
   a support structure;
   an optical assembly fixed to the support structure, wherein the optical assembly projects an image of the scene at the one or more focal plane arrays;
   a cryogenically-cooled cold head in a vacuum Dewar that is coupled to the support structure;
   a flexure structure that is thermally and mechanically coupled between the cold head and the assembly, wherein motion of the flexure structure is constrained to one or more degrees of freedom; and
   a drive actuator mechanically coupled to the flexure structure, the drive actuator causes movement of the focal plane arrays relative to the support structure in accordance with the one or more degrees of freedom of the flexure structure,
   wherein the flexure structure constrains motion of the assembly to the one or more degrees of freedom and conducts thermal power from the assembly to the cryogenically-cooled cold head.

2. The system of claim 1, wherein:
   the flexure structure has a thermal conductance which limits a temperature rise for the one or more focal plane arrays, on order of less than 5 degrees Kelvin.

3. The system of claim 2, wherein the flexure structure comprises silicon.

4. The system of claim 1, wherein the image moves relative to the support structure due to movement of a scanning component in the optical assembly.

5. The system of claim 4, wherein a focal plane array of the one or more focal plan arrays comprises a first portion on which pixels are arranged on a first regular grid with a constant spacing and a second portion on which pixels are arranged on a different second regular grid with the constant spacing and offset from the first regular grid by less than the constant spacing and more than about one eighth of the constant spacing.

6. The system of claim 4, further comprising a plurality of close proximity filters, wherein a first proximity filter of the plurality of proximity filters is fixed over a first portion of the one or more focal plane arrays and a different second proximity filter of the plurality of proximity filters is fixed over a different second portion of the one or more focal plane arrays.

7. The system of claim 6, wherein the first proximity filter passes only light in a first band of optical wavelengths and the second proximity filter passes only light in a different second band of optical wavelengths.

8. The system of claim 7, wherein the first band of optical wavelengths is composed of mid-wavelength infrared (MWIR) radiation and the second band of optical wavelengths is composed of long wavelength infrared (LWIR) radiation.

9. The system of claim 7, wherein the first band of optical wavelengths is composed of mid-wavelength infrared (MWIR) radiation and the second band of optical wavelengths is composed of short wavelength infrared (SWIR) radiation.

10. The system of claim 6, wherein the first proximity filter passes only light having a first range of polarization modes and the second proximity filter passes only light having a different second range of polarization modes.

11. The system of claim 1, wherein the actuator, during movement of the one or more focal plane arrays relative to the support structure, causes a first portion of the each focal plane array to capture the image of the scene for an integration time interval and subsequently causes a different second portion of the each focal plane array to capture an image of the same scene for the integration time interval.

12. The system of claim 11, wherein the integration time is in a range from about 0.1 millisecond to about 10 milliseconds.

13. The system of claim 1, wherein the assembly further comprising a motherboard and components including at least one of a capacitor, a temperature sensor and a motion sensor wherein the components have a mass lower than optical components of the optical assembly.

14. The system of claim 1, wherein the flexure structure has only one degree of freedom parallel to the one or more focal plane arrays.

15. The system of claim 1, wherein the flexure structure includes two orthogonal linear degrees of freedom parallel to the one or more focal plane arrays.

16. The system of claim 1, wherein the flexure structure includes one rotational degree of freedom parallel to the one or more focal plane arrays.

17. The system of claim 16, wherein movement of the image relative to the support structure is in a range from about 10 times a width of one pixel to about 400 times the width of the pixel.

18. The system of claim 1, wherein the flexure structure includes one degree of freedom perpendicular to the one or more focal plane arrays.

19. The system of claim 1, wherein the flexure structure comprises a plurality of prismatic flexure assemblies.

20. The system of claim 1, wherein the each focal plane array comprises:
- a readout integrated circuit (IC) comprising a plurality of readout elements arranged on an integrated circuit in a first regular grid with constant spacing; and
- a detector array comprising a corresponding plurality of detector elements which comprises a first portion in which detector elements are arranged on the first regular grid and a second portion in which detector elements are arranged on a different second regular grid with the constant spacing and offset from the first regular grid by less than the constant spacing and more than about one eighth of the constant spacing,
- wherein the each focal plane array is configured to capture an image incident on the plurality of detector elements as image data at the plurality of readout elements.

21. A method comprising:
- capturing, by one or more focal plane arrays comprising a plurality of pixels of an assembly in a Dewar, an image of a scene incident on the one or more focal plane arrays as image data during an integration time interval;
- forming, by an optical assembly fixed to a support structure, the image of the scene at the one or more focal plane arrays;
- moving, by a flexure structure mechanically and thermally coupled to both a cryogenically-cooled cold head in a Dewar and the one or more focal plane arrays, the one or more focal plane arrays relative to the support structure in a direction of movement of the scene; and
- moving, by a drive actuator mechanically coupled to the flexure structure, the one or more focal plane arrays relative to the support structure in sync with the movement of the image of the scene during the integration time interval to compensate for the movement of the image of the scene and minimize blur,
- wherein the flexure structure constrains motion of the assembly to the one or more degrees of freedom and conducts thermal power from the assembly to the cryogenically-cooled cold head.

22. The method of claim 21, further comprising providing the flexure structure having a thermal conductance which limits a temperature rise for the one or more focal plane arrays, on order of less than 5 degrees Kelvin.

23. The method of claim 21, wherein the image is moving relative to the optical assembly due to movement of a scanning component in the optical assembly.

24. The method of claim 21, wherein moving, by the drive actuator, the one or more focal plane arrays comprises driving the one or more focal plane arrays to cause a first portion of the one or more focal plane arrays to capture the image of the scene for the integration time interval and subsequently to cause a different second portion of the focal plane array to capture an image of the same scene for the integration time interval.

25. The method of claim 24, wherein the driving of the one or more focal plane arrays comprises driving the one or more focal plane arrays with the flexure structure moving in accordance with only one degree of freedom.

26. The method of claim 24, wherein the driving of the one or more focal plane arrays comprises driving the one or more focal plane arrays with the flexure structure moving in accordance with two orthogonal linear degrees of freedom.

27. The method of claim 24, wherein the driving of the one or more focal plane arrays comprises driving the one or more focal plane arrays with the flexure structure moving in accordance with one rotational degree of freedom.

28. The method of claim 24, wherein the driving of the one or more focal plane arrays comprises driving the one or more focal plane arrays with the flexure structure moving in accordance with one degree of freedom perpendicular to the one or more focal plane arrays.

29. A Dewar configured to be coupled to a support structure supporting an optical assembly wherein the optical assembly projects an image of a scene, the Dewar comprising:
- an assembly comprising one or more focal plane arrays, each comprising a plurality of pixels, wherein the one or more focal plane arrays captures the image of the scene;
- a cryogenically-cooled cold head in a vacuum Dewar that couples to the support structure;
- a flexure structure that is thermally and mechanically coupled between the cold head and the assembly, wherein motion of the flexure structure is constrained to one or more degrees of freedom; and
- a drive actuator mechanically coupled to the flexure structure, the drive actuator causes movement of the focal plane arrays relative to the support structure in accordance with the one or more degrees of freedom of the flexure structure,
- wherein the flexure structure constrains motion of the assembly to the one or more degrees of freedom and conducts thermal power from the assembly to the cryogenically-cooled cold head.

\* \* \* \* \*